INVENTOR:
David M. Boyd Jr.

BY: Chester J. Giuliani
Philip T. Liggett
ATTORNEYS

Aug. 23, 1966  D. M. BOYD, JR  3,268,604
FLUID FLOW CONTROL SYSTEM FOR SIMULATED MOVING BED PROCESSES
Filed Nov. 6, 1961  8 Sheets-Sheet 4

INVENTOR:
David M. Boyd Jr.
BY: Chester J. Giuliani
Philip T. Liggett
ATTORNEYS

Aug. 23, 1966  D. M. BOYD, JR  3,268,604
FLUID FLOW CONTROL SYSTEM FOR SIMULATED MOVING BED PROCESSES
Filed Nov. 6, 1961  8 Sheets-Sheet 5

INVENTOR:
David M. Boyd Jr.

BY: Chester J. Giuliani
Philip T. Liggett
ATTORNEYS

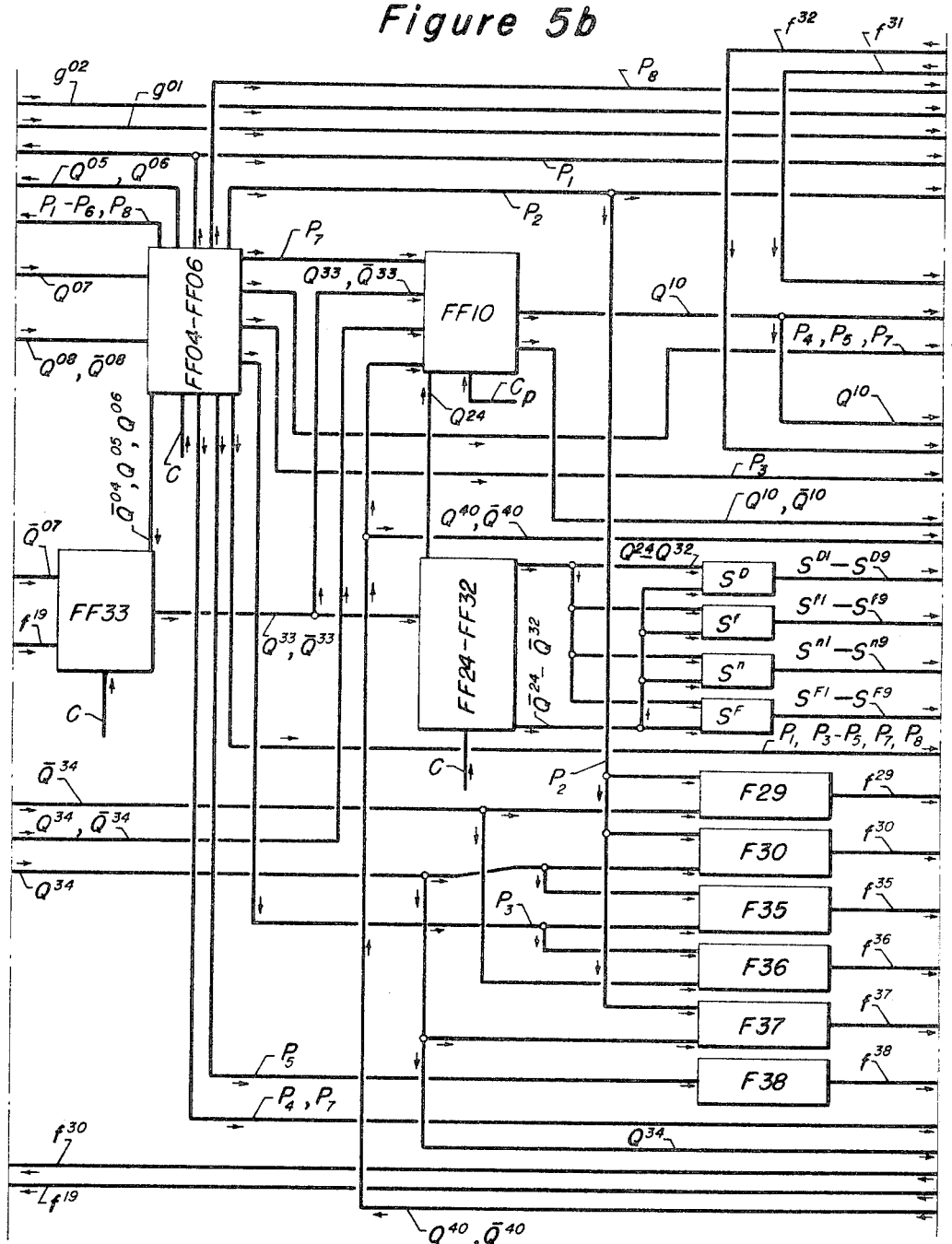

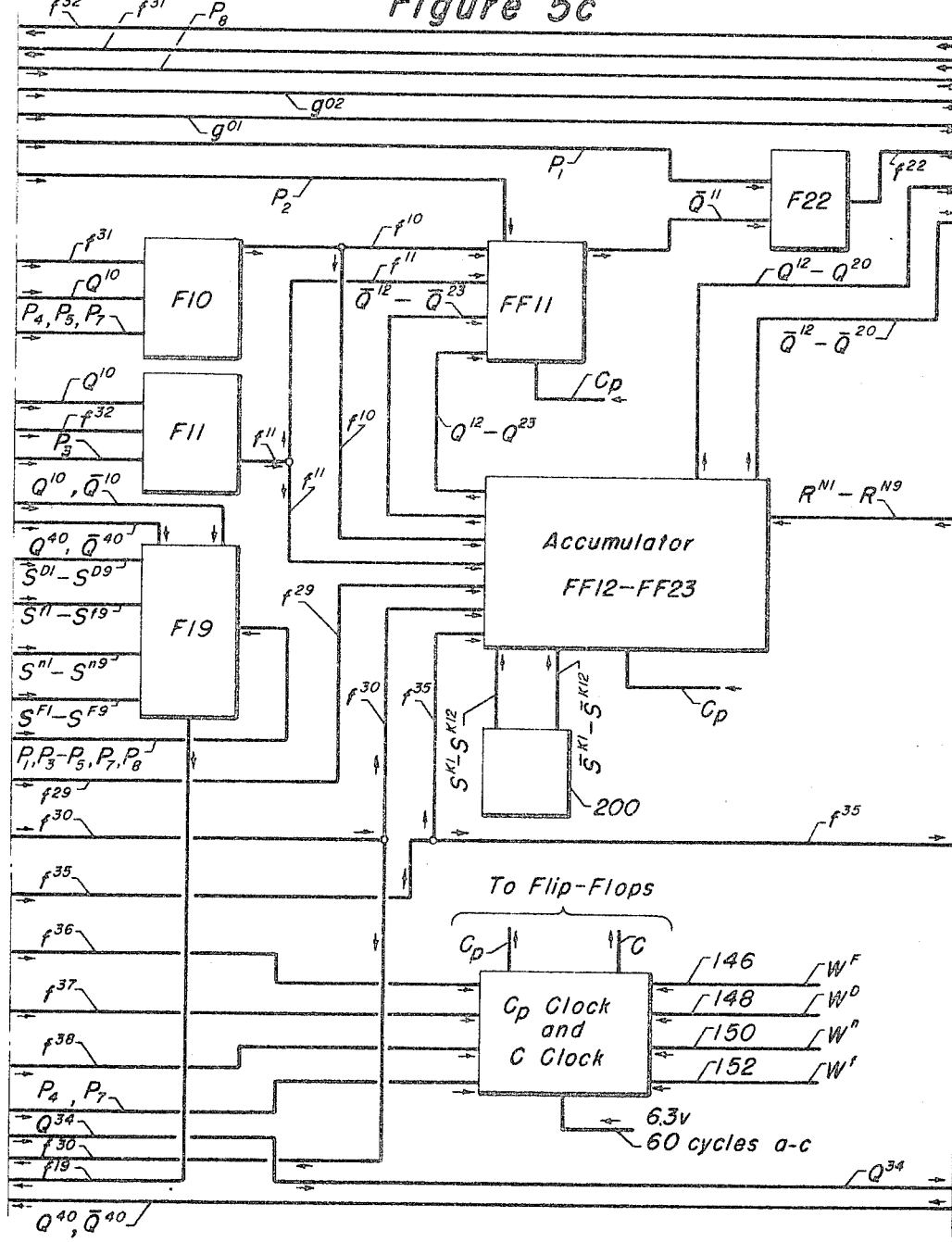

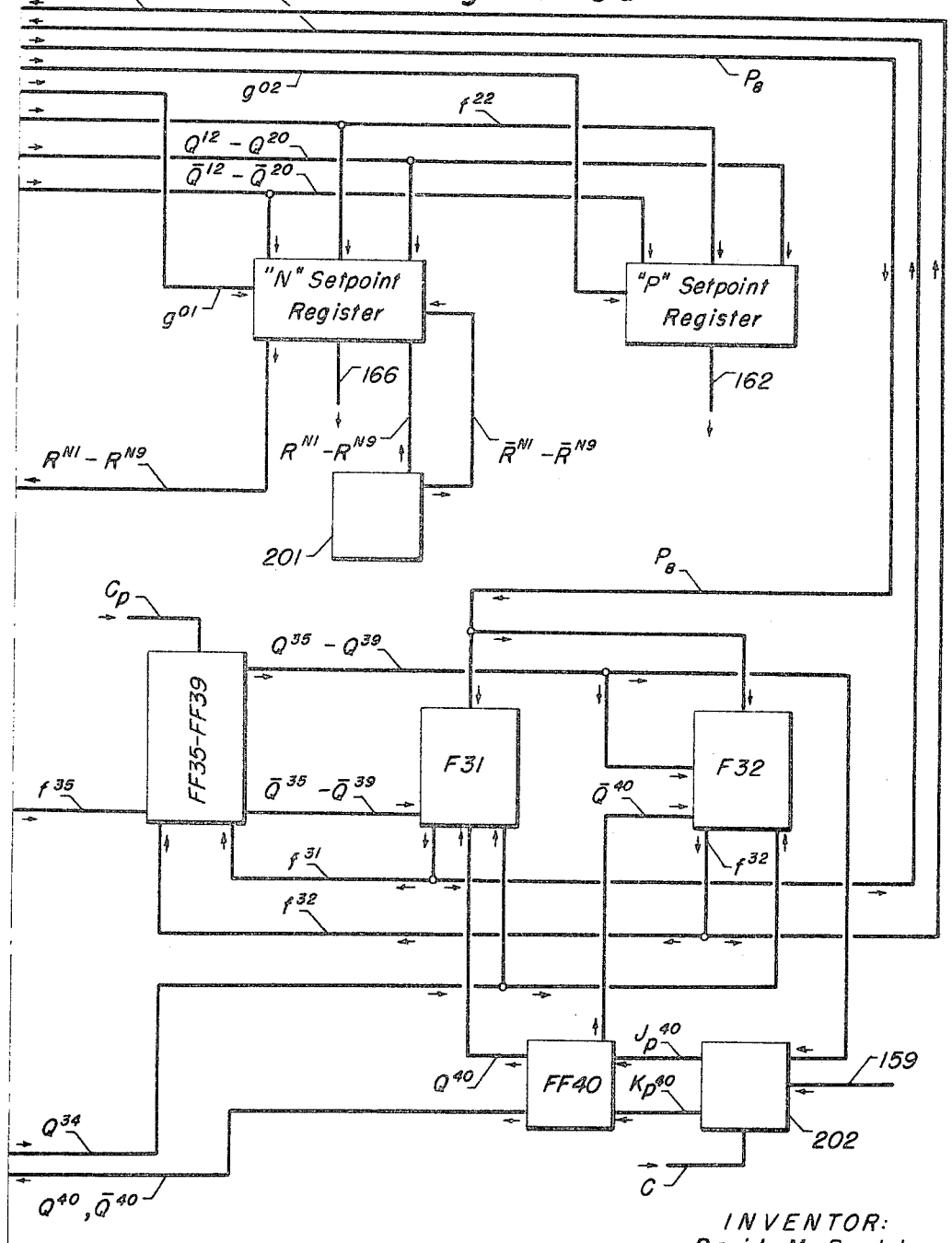

United States Patent Office 3,268,604
Patented August 23, 1966

3,268,604
FLUID FLOW CONTROL SYSTEM FOR SIMULATED MOVING BED PROCESSES
David M. Boyd, Jr., Clarendon Hills, Ill., assignor to Universal Oil Products Company, Des Plaines, Ill., a corporation of Delaware
Filed Nov. 6, 1961, Ser. No. 150,434
20 Claims. (Cl. 260—666)

This invention relates to a method and apparatus for controlling the fluid flow rate in a selected one of a serial plurality of fluid flow-conducting zones which are advanced progressively through an elongated fixed bed of solid containing material, said zones having diverse flow rates therethrough by reason of the simultaneous introduction to and withdrawal from said bed, at spaced transfer points therealong, of various process streams the points of entry and exit of which define the lines of demarcation between said flow-conducting zones and which, in being periodically advanced in unison successively from one set of transfer points to the next, effect a corresponding displacement or movement of said flow-conducting zones longitudinally through the bed. These characteristics of such fluid manipulating process are embodied in a recently developed continuous-cyclic sorption process for the separation of fluid compounds utilizing a fixed bed of solid sorbent.

It is known in the art of separation processes that mixtures of compounds which are difficultly separable by distillation, crystallization or extraction techniques may often be readily resolved by contacting the mixture with a solid or solids which selectively combine in some form with at least one component of the mixture; the mechanism by which a component is selectively retained may be adsorption, absorption, clathration, occlusion or chemical reaction and all of these mechanisms are generally designated herein as "sorption" processes. A particularly desirable sorption process, one widely recognized in the art, involves the separation of mixtures of isomeric hydrocarbons by means of a solid particulate sorbent comprising a dehydrated metal aluminosilicate, commonly known as "molecular sieves." The separation may be readily effected by passing a mixture of iso and normal hydrocarbons over the sorbent whereby the normal hydrocarbon is sorbed by the sieves and an effluent or raffinate stream of substantially pure iso hydrocarbons is recovered. When it is desired to make a continuous process of this selective quality, it is necessary, in order to reuse the sieves and to recover the normal product or sorbate, to desorb the normal hydrocarbon from the sieves. This can be accomplished by subjecting the normal hydrocarbon-saturated sieves to the influence of a preponderantly greater quantity of desorbent which is preferably a material capable of displacing the normal hydrocarbon from the sieves and which is readily separable from the normal hydrocarbon by fractional distillation.

A continuous process for separating iso from normal paraffins may be effected by employing a moving bed of sorbent which passes downwardly as a column from a sorption zone, wherein the sorbent counter-currently contacts a rising stream of mixed iso and normal hydrocarbons and thereby sorbs the normal, to a desorption zone immediately below the feed point wherein the bed is contacted with a desorbent. A suitable column may have an intermediate feed point for the iso-normal mixture and a lower feed point for the desorbent operated in conjunction with an upper takeoff point for removing a mixture of iso hydrocarbons and desorbent and a takeoff point immediately below the feed point for removing a mixture of normal hydrocarbons and desorbent. The molecular sieves discharged from the bottom of the column must be lifted to the top and begin their descent to produce the effect of a continuously moving column passing downwardly through all zones. Although this system is very desirable because it yields a continuous product and may be operated as a continuous process, it is very difficult to carry out in practice because the molecular sieves are physically fragile and are soon destroyed by the strains involved in a moving bed process.

It has been found that an essentially continuous selective sorption process may be effected by maintaining the sorbent in the form of a fixed elongated bed or series of discrete beds and moving the feed and product inlet and outlet pionts instead of attempting to move the bed itself. In this method the various incoming and outgoing process streams are charged and withdrawn respectively to the contacting column, in a continuous manner, without interruption, with respect to either the flow rates or compositions of the several streams, the bed of solid sorbent remaining in substantially fixed position within the sorption column, and the feed and desorbent inlet points and the product withdrawal points being translated along the column in equal increments by a stream distributing means. Although the solid sorbent remains in fixed position, a simulated countercurrent flow arrangement is thereby established, since incoming feed is contacted at its point of introduction with sorbent which is relatively spent in comparison with downstream contacting zones; that is, the raffinate stream or least sorbed component of the feed stock is withdrawn from a bed in a series of sorbent "beds" constituting the sorption zone at the opposite end of the series from the feed stock inlet. This process may also be visualized as being carried out in a series of four equilibrium zones within a single fixed bed of solid sorbent having no actual line of demarcation between each of the zones other than the zone boundaries defined by the points of inlet and withdrawal of the various fluid process streams. The first and farthest upstream zone is referred to as a "sorption" zone, the next downstream zone is referred to as a "primary rectification" zone, the next adjacent downstream zone is referred to as a "desorption" zone and the farthest downstream zone is designated as a "secondary rectification" zone. The terms "upstream" and "downstream" are to be interpreted herein in their ordinary and usual definition in the chemical process arts; that is, the term "downstream" refers to an advanced point in the direction of flow relative to the point of reference, whereas "upstream" refers to a retrospective point in the direction of fluid flow. A fluid pump is provided between at least one pair of adjacent beds to provide a positive, unidirectional flow of fluid which is the basic circulation flow maintained through the serially connected sieve beds in the absence of feed introduction and product withdrawal. One of the essential characteristics of the process is that a continuously flowing stream of fluid is circulated through the elongated fixed bed or series of beds from the first to the last in series; this circulating stream is designated herein as the "pumparound" stream. It is also necessary that the contacting zone be elongated in the direction of fluid flow therethrough so that a partitioning effect with respect to the components being separated may be realized and spurious concentration gradients in directions other than the direction of flow may be avoided.

The successful operation of this simulated moving bed fluid-solid contacting process hinges upon the precise control of a number of critical variables such as the flow rates of the various process streams, the system pressure and temperature, the rate at which the feed and product inlet and outlet points are moved along the length of a fixed bed or beds, and especially the pumparound flow rate, which must be controlled to within at least 1–2% of the operating point to achieve a reasonably good separation between the components of the feed. It has been found that a deviation of only 10% in the pumparound flow rate, if sustained sufficiently long for steady-stage conditions to obtain, will cause the degree of separation to approach zero. When the flow rates of the inlet and outlet process streams are established at predetermined levels by suitable automatic means, the pumparound rate may still be independently varied without upsetting the plant material balance; as noted, however, the product composition is critically dependent upon the magnitude of the pumparound flow rate. In the steady-stage operation of this process, it is apparent from a material balance that the sum of the mass flow rates of the inlet streams must equal the sum of the mass flow rates of the outlet streams; and in nonreactive systems, such as the separation process herein described, where there are no molecular changes, the sum of the volumetric flow rates of the inlet streams is also substantially equal to the sum of the volumetric flow rates of the outlet streams. The flows of the inlet and outlet streams are added to and subtracted from the basic circulation flow (pumparound flow) through the elongated contacting zone so that the actual volumetric flow rate will be different in each of the four equilibrium zones; furthermore, since the points of entry and exit of the various streams are moved incrementally or approximately continuously with time, the zones of minimum, intermediate and maximum flow rates are correspondingly shifted. Essentially, then, the mechanism of the process may be visualized as taking place in a series of four discrete zones, each having a different flow rate therethrough and each having a different component concentration profile along the length of the zone, which zones exist simultaneously at any instant of time within a single elongated fixed bed at spaced intervals along the length thereof; these zones move through the bed at a speed determined by the rate at which the inlet and outlet streams are advanced, but the physical spacing therebetween remains constant. Since one end of the elongated bed communicates with the other through the pumparound means to form a closed flow path therethrough, the four equilibrium zones are repeatedly advanced through the bed and thus, to an observer stationed at a fixed point external to the system, they appear to "rotate" at constant speed relative to said bed. Similarly, a flow-regulating means, such as a conventional flow control loop comprising a transmitter, controller and motor valve, disposed at a single fixed point in the closed flow path would "see" in succession each of the four equilibrium zones the flow rates of which must be maintained at different levels. If the setpoint of such flow-regulating means were held constant, then the flow rate of each zone would swing, during one operating cycle, through an amount equivalent to the magnitude of whichever process stream (feed, desorbent or product streams) has the highest flow rate, and the process would be totally inoperable.

As one solution to this control problem, it has been proposed to provide a plurality of flow-measuring points spaced around the length of the closed flow path and to periodically shift the source of the input information to the pumparound flow controller from one flow-measuring point to the next in the same direction as the process streams are shifted so that the flow controller in effect "keeps in step" with the rotating equilibrium zones and sees only one of the zones throughout the operating cycle. This method, however, suffers several drawbacks which tend to detract from the flexibility of the process and include, among others, a requirement that the number of flow transmitters be at least as great as the total number of incoming and outgoing process streams, and a requirement that the entrance and exit points of the process streams be symmetrically spaced around the flow path, with the result that a particular separation process wherein, for example, the sorption zone must be made twice as long as the desorption zone could not be controlled by the multiple flow-measuring point technique.

The present invention provides a completely flexible fluid flow control system for a simulated moving bed process of the class described. The instant control system includes a special purpose, variable program digital computer which receives flow rate information from a plurality of the process streams entering and leaving the contacting zone and state-of-operating cycle information from the process stream distributing means, repetitively computes a setpoint signal for the pumparound flow-regulating means in accordance with a particular one of a group of volumetric balance equations which defines the flow system for a given instantaneous orientation of process streams relative to the location of said flow-regulating means, transmits the setpoint signal to the flow-regulating means, and upon a significant reorientation of said process streams—that is, a translation of process streams which requires a new volumetric balance equation to define the system—automatically proceeds to compute the setpoint signal in accordance with said new equation, and so on around the operating cycle. The control system therefore maintains constant the flow rate of a selected one of the four equilibrium zones irrespective of changes in the flows of one or more of the process streams and irrespective of the instantaneous physical position of the controlled zone relative to the pumparound flow-regulating means.

The present invention further provides a method and means for maximizing the separation efficiency of a simulated moving bed process of the class described including a special purpose digital computer which receives fluid composition information from a process stream analyzer disposed at a fixed analysis point in the closed flow path, and periodically adjusts the flow rate of one of the process streams in response thereto. This composition control computer and the aforementioned flow control computer are advantageously integrated so that certain functional components utilized by both may be time-shared.

A broad embodiment of this invention provides a fluid flow control technique for a continuous fluid-solid contacting process for altering the composition of a feed stream to yield a product stream wherein a pumparound fluid is continuously circulated through an elongated contacting zone containing a solid contacting material which effects said alteration of composition, one end of said contacting zone communicating with the other through a flow-regulating means to form a closed flow path therethrough and said contacting zone having a plurality of intermittently flow-conducting transfer points spaced along the length of said flow path, and wherein $r$ fluid process streams including said feed and product streams are substantially simultaneously introduced to and withdrawn from said contacting zone through a set of corresponding inlet and outlet points selected from said transfer points, and wherein said process streams are periodically shifted in unison successively from one set of transfer points to the next in a down-stream direction with respect to the flow of said pumparound fluid whereby each of said process streams eventually passes through each of said transfer points, which flow control technique is directed to controlling the flow rate of said pumparound fluid existing within that portion of said contacting zone which lies between a selected pair of adjacent process streams irrespective of their instantaneous physical position relative to said flow-regulating means, and which comprises the following steps: separately sensing the flow rates of at least $r-1$ process streams and producing a group of flow sensations corresponding thereto; automatically producing from said group of flow sensations a setpoint signal in accordance with the number, direction and flow rates of the process streams passing through those transfer points between said flow-regulating means and the one of said pair of adjacent process streams which is more remote from said flow-regulating means; and adjusting said flow-regulating means in response to said setpoint signal.

Other embodiments of the invention will be described with greater particularity hereinbelow. At this point it might be well to emphasize the fact that the essential invention herein is a manipulative or fluid-handling technique as distinguished from a chemical or physiochemical process involving catalytic phenomena or principles of reaction kinetics, mass transfer and the like. Therefore, although the present invention finds immediate utility in controlling a selective sorption process wherein mass transfer equilibria happen to be important, the operability and utility of the control system are not so limited. Rather, it is broadly applicable to any process for altering the composition of a feed stream to yield a product stream, including reaction-regeneration processes, the physical configuration of which is geometrically equivalent to a selective sorption process of the class described and which consequently presents the same problem of flow control which is met and solved by the present invention.

The present control sysetm may best be described in conjunction with the accompanying drawings which are presented as illustrative of the best mode of practicing the invention but are not intended to be limiting upon its broad scope. It is recognized that various modifications of the particular techniques and apparatus illustrated can readily be made by one skilled in the art without departing from the broad scope of the present invention.

FIGURE 1 of the drawings is a flow diagram of a simulated moving bed process for the separation of fluid compounds in combination with the control system of this invention, wherein the supervisory computer and the process stream distributing means are represented diagrammatically as blocks.

FIGURES 5a–5d, viewed collectively, represent a schematic signal flow diagram of a special purpose digital computer suitable for attaining the several objects of this invention.

In order to further facilitate a clearer presentation of the subject matter, the subsequent treatment thereof will be divided into three major headings: the process in general; operation of the control system; and the computer.

I. *The process in general*

As mentioned above, the simulated moving bed process may be advantageously employed to effect the separation of isomeric hydrocarbons utilizing molecular sieves as the sorbent. In general, the feed stock comprises a mixture of at least one normal aliphatic hydrocarbon containing at least four carbon atoms and one or more branched chain or cyclic hydrocarbons containing at least four carbon atoms. For convenience, the term "isohydrocarbons" as employed herein is intended to connote either branched chain or cyclic hydrocarbons or a mixture of both. The molecular sieve sorbent may comprise a dehydrated calcium aluminosilicate hydrate having a pore diameter of about 5 angstrom units; molecular sieves of this type are able to selectively sorb a straight chain compound containing at least four carbon atoms and to reject cyclic or branched chain compounds also containing at least four carbon atoms. The desorbent is a fluid capable of displacing the selectively sorbed component from the sorbent and typically is a hydrocarbon of lower molecular weight than the selectively sorbed component. When feed stock comprising a mixture of iso and normal hydrocarbons is passed through a sieve bed, the major portion of the normal hydrocarbon is initially retained therein and the resultant effluent is relatively rich in isohydrocarbon. After the sieves have become saturated with normal hydrocarbon, no further sorption is possible and the composition of the effluent ultimately becomes the same as that of the feed. A desorbent stream is then passed through the bed, which displaces the previously sorbed normal hydrocarbon from the sieves, and the effluent now principally comprises a mixture of normal hydrocarbon and desorbent. By alternately introducing feed and desorbent to the sieve bed and withdrawing therefrom portions of the effluent at the appropriate times, an efficient separation between the normal and iso hydrocarbons may be obtained; although the two product streams are contaminated with desorbent, this may be easily removed by subsequent fractionation of the product streams whereby normal and iso hydrocarbon product purities in excess of 99% may be readily achieved.

Figure 1:
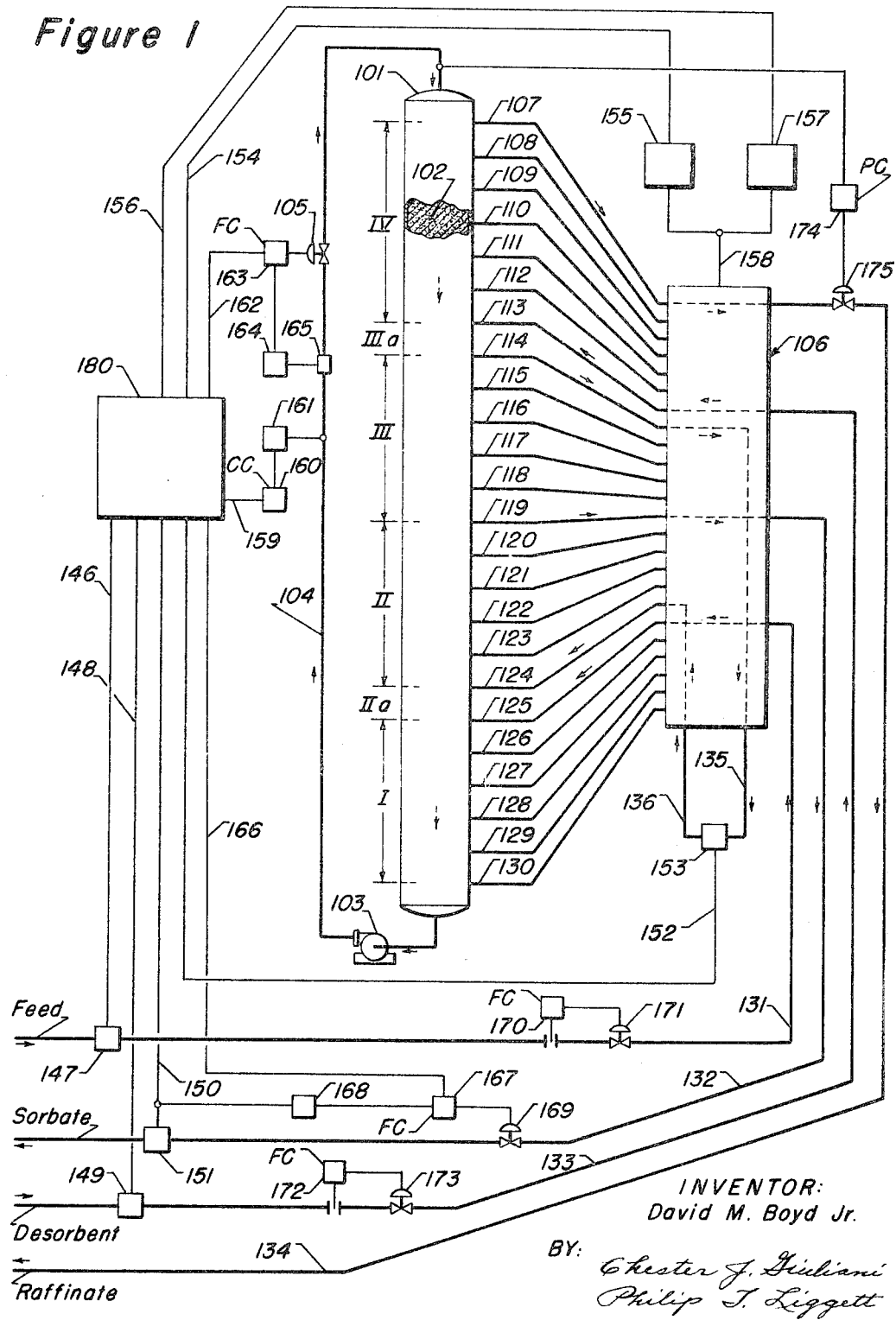
Figure 2:
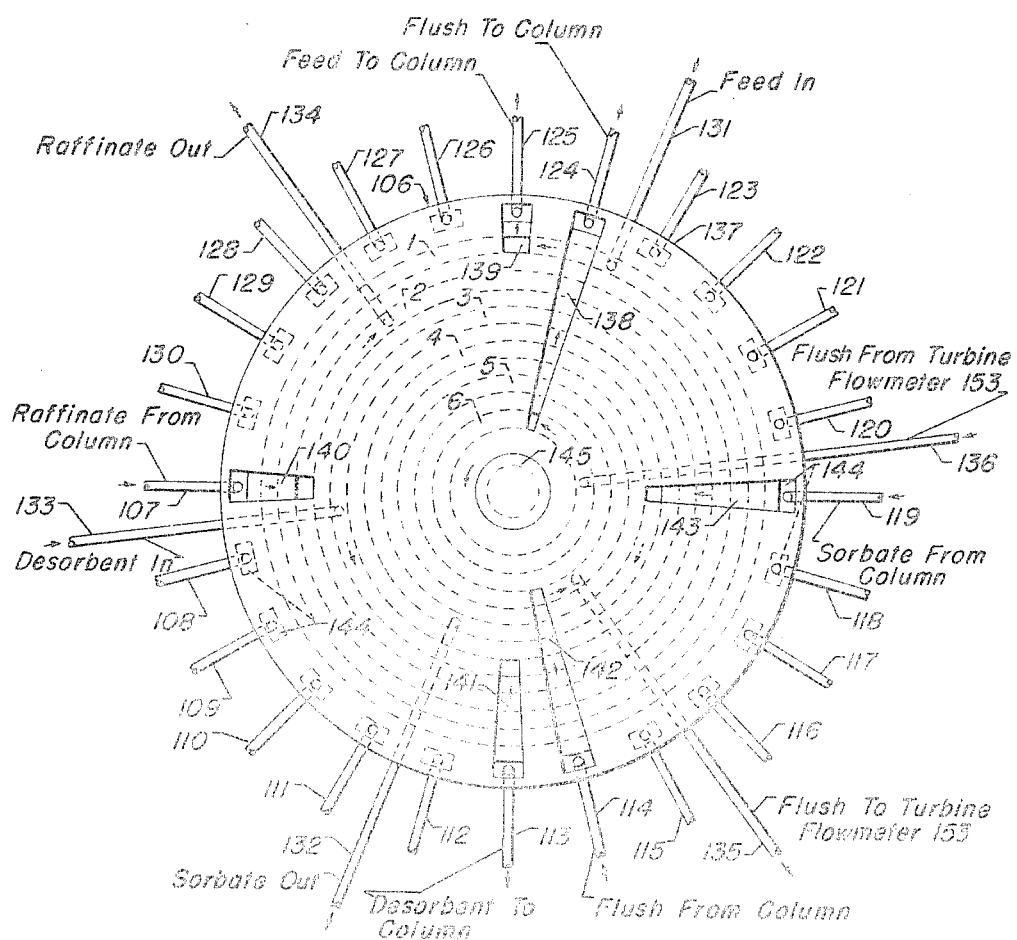
FIGURE 2 is a plan view of the stream distributing means, specifically a multiport rotary valve, of FIGURE 1.

The above-described sorption process may be implemented in a continuous manner using the flow scheme illustrated in FIGURE 1. To provide a specific explanatory framework, its operation will be discussed with reference to the separation of a mixture of normal and isohexanes using n-butane as the desorbent, although it will be appreciated that other charge stocks such as heavy naphthas, kerosenes, diesel oils, mixed aromatics, heavy cycle stocks, gas oils and the like may be similarly treated. This particular separation is best effected entirely in the liquid phase and at substantially isothermal conditions, although the flow arrangement of the simulated moving bed process is equally well adapted to gas or vapor phase operations. With reference now to FIGURE 1, there is shown an elongated contacting vessel or column 101 which contains a fixed molecular sieve bed 102. Alternatively, column 101 may comprise a plurality of serially connected columns and sieve bed 102 may comprise a plurality of discrete beds disposed on spaced trays within the column. A pumparound means for circulating liquid from the bottom of column 101 to the top thereof is provided by way of pump 103, line 104 and flow control valve 105. A multiport rotary distributing valve 106, the details of which will be described later in connection with FIGURE 2, is connected to twenty-four fluid transfer lines 107 to 130, inclusive, which in turn are in open communication with sieve bed 102 at points spaced along the length thereof. Four fluid transport conduits 131 to 134, inclusive, are connected to distributing valve 106 such that each of conduits 131–134 is placed in fluid communication with a selected one of lines 107–130. As valve 106 is rotated from one adjusted position to the next, conduits 131–134 are disconnected from their previous corresponding transfer lines and are reconnected to the next adjacent transfer lines; thus, during the course of one valve revolution, each of transport conduits 131–134 comes into fluid communication for a time with each of transfer lines 107–130. Distributing valve 106 and transfer lines 107–130 together comprise one form of stream distributing means; other means may be employed such as a plurality of automatic gate valves suitably manifolded and opened and closed in the proper sequence by a program controller. It is obvious that a greater or lesser number of transfer lines may be employed; however, it has been found that twenty-four transfer lines are sufficient to approximate a substantially continuous operation.

Four process streams are introduced to and withdrawn from column 101 as follows: a feed stream comprising a mixture of normal and isohexanes is charged to the unit through line 131; a sorbate stream comprising a mixture of n-hexane (selectively sorbed component) and desorbent is withdrawn from the unit through line 132; a desorbent stream of n-butane is charged to the unit through line 133; a raffinate stream comprising a mixture of isohexanes (relatively less sorbed component) is withdrawn from the unit through line 134. When the rotary distributing valve 106 is in the position shown in FIGURE 1, raffinate is withdrawn from column 101 through transfer line 107, desorbent is introduced through transfer line 113, sorbate is withdrawn through transfer line 119, and feed is charged through transfer line 125. In addition, a flush stream comprising principally desorbent is withdrawn through line 114, valve 106 and line 135, and is returned to column 101 through line 136, valve 106 and line 124; the purpose of the flush stream is to sweep out the transfer line which has previously conducted feed thereby preventing contamination with feed of the sorbate product stream which will be the next process stream to pass through this transfer line. The flush stream is passed through an external flow-measuring loop (line 135, flowmeter 153 and line 136) in order to furnish flow rate information to the computer as hereinafter described; line 135 also includes a flush pump and flow-regulating means (not shown). A continuously circulating, unidirectional flow of pumparound liquid from the top of column 101 to the bottom thereof is provided by pumparound pump 103.

FIGURE 2 is a plan view of rotary distributing valve 106 with the top rotor cover plate removed therefrom. Its indicated angular position corresponds with that of FIGURE 1. A discular rotor member 137 seats upon a lower stator member not visible in this view and is incrementally rotated by shaft 145. Twenty-four peripheral ports 144 are formed in the stator, each being connected to one of transfer lines 107–130. Six concentric circular grooves, numbered 1 through 6 inclusive, are formed in the undersurface of rotor 137. The four transport conduits 131–134 and the flush flow-measuring loop conduits 135 and 136 each communicate continuously with a corresponding one of the circular grooves by extending upwardly through the stator at the appropriate radial distance from shaft 145; thus, feed inlet conduit 131 connects with groove 1, raffinate withdrawal conduit 134 with groove 2, desorbent inlet conduit 133 with groove 3, sorbate withdrawal conduit 132 with groove 4, flush conduit 135 with groove 5 and flush conduit 136 with groove 6. Six radially extending channels, numbered 138 to 143, inclusive, are formed in the body of rotor 137; each such channel extends downwardly at the ends thereof so that the inner end communicates with one of the rotor circular grooves and the outer end with one of the peripheral stator ports 144; thus, channel 138 conducts flush from groove 6 to column 101; channel 138 conducts feed from groove 1 to the column; channel 140 conducts raffinate from the column to groove 2; channel 141 conducts desorbent from groove 3 to the column; channel 142 conducts flush from the column to groove 5; and channel 143 conducts sorbate from the column to groove 4. It may be seen, then, that fluid transport conduits 131, 132, 133 and 134 and flush flow-measuring loop conduits 135 and 136 are each in individual open fluid communication with column 101 at corresponding transfer points spaced along the length thereof via a distributing valve path defined by a peripheral stator port, a rotor channel, a rotor groove, and an interior stator port. Rotor 137 is periodically advanced in a counterclockwise direction which corresponds to translating the points of entrance and exit of the four process streams and the flush stream along column 101 in a downstream direction with respect to the direction of pumparound flow therethrough. When, for example, rotor 137 is moved to its next adjusted position from that shown in FIGURES 1 and 2, raffinate will be withdrawn from column 101 through transfer line 108, desorbent will be introduced through line 114, flush will be withdrawn from line 115, sorbate will be withdrawn from line 120, flush will be introduced through line 125, and feed will be introduced through line 126. Normally the rotary distributing valve is held in an adjusted position for about ½ to about 10 minutes, after which it is quickly advanced to its next adjusted position, thereby simultaneously shifting the points of entry and withdrawal of the feed, product and flush streams in equal increments in a downstream direction relative to the pumparound flow through the sieve bed. After the rotary valve has completed one revolution, i.e., advanced through twenty-four adjusted positions, each of conduits 107–130 will have conducted, in turn, feed in, flush in, sorbate out, flush out, desorbent in, and raffinate out.

Distributing valve 106 is conveniently rotated by an automatic valve driving means not shown here. A suitable rotary valve driving means is described in United States Patent 2,948,166 issued to F. V. Purse et al.

With reference again to FIGURE 1, when distributing valve 106 occupies the position therein illustrated, the feed stream, consisting principally of a mixture of normal and isohexanes, enters column 101 through transfer line 125, joins the circulating pumparound liquid therein and flows downstream through the sieve bed, pump 103, and line 104 to the top of column 101; that portion of the sieve bed which is downstream from the feed inlet point constitutes the sorption zone. In the sorption zone the feed stock contacts the molecular sieve sorbent which selectively sorbs the n-hexane component of the feed stock into its porous structure and selectively excludes the isohexane components thereof, the straight chain component being retained in the solid sorbent while the branched chain and/or cyclic components are permitted to pass through the bed of sorbent. At the downstream end of the sorption zone a mixture consisting essentially of isohexanes and n-butane remains and a portion of this mixture is withdrawn as raffinate through transfer line 107. The next portion of the sieve bed downstream from the raffinate withdrawal point constitutes the primary rectification zone wherein remaining pumparound liquid undergoes a secondary separation whereby the isohexanes are concentrated in the initial portion of the bed immediately succeeding the raffinate withdrawal point. Such concentration of isohexanes is not a mechanism of sorption in the same sense that n-paraffins are sorbed into the pores of the molecular sieves, but rather involves the displacement of n-butane from the void spaces between the sieves by raffinate; the n-butane had filled the void spaces between the sieves by reason of the fact that the primary rectification zone had just previously, in the preceding quarter-cycle of operation, functioned as the desorption zone, hereinafter described, and accordingly contains mostly n-butane occupying the void spaces between the sieves, the n-hexane having been displaced from the pores and removed from the system. Thus only essentially pure n-butane is present in the pumparound liquid leaving the primary rectification zone and to this pumparound liquid is added fresh n-butane through transfer line 113. The next portion of the sieve bed downstream from the desorbent inlet point is the desorption zone wherein a preponderance of n-butane displaces from the pores of the molecular sieve sorbent the n-hexane component previously sorbed from the feed stock in a prior cycle of operation. Although a flush stream is withdrawn from the transfer line immediately downstream from the desorbent inlet point, i.e., through transfer line 114, the flow rate of the flush stream is very low in relation to the flow rate of the pumparound liquid at that point, for example, from about 1% to about 5% of the total pumparound liquid flow rate, so that the portion of the molecular sieve bed between the desorbent inlet point and the flush withdrawal point is not functionally different from the sorption zone as a whole; in other words, the withdrawal of the flush stream does not materially disturb the mass transfer equilibria within the desorption zone. At the end of the desorption zone, the portion of the pumparound liquid, which now comprises mainly n-hexane and n-butane, is withdrawn as sorbate through transfer line 119. The next portion of the sieve bed downstream from the sorbate withdrawal point forms the secondary rectification zone wherein isohexanes previously retained by the sieves are washed out of the bed by the circulating pumparound stream. At the end of the secondary rectification zone, the pumparound liquid, now comprising mainly n-hexane, isohexanes and n-butane is joined with feed stock entering the zone through transfer line 125, thus completing the circuit around the closed flow path. As hereinbefore mentioned, the incoming flush stream is directed through a transfer line immediately upstream from the feed inlet point, i.e., through transfer line 124; since the flow rate of this flush stream is relatively low, that portion of the molecular sieve bed between the flush inlet point and the feed inlet point is not functionally different from the secondary rectification zone as a whole. Each of the four above-described functional process zones exist simultaneously in spaced relation along the length of the elongated contacting bed. As the rotary distributing valve is rotated, these four zones also progress through the sieve bed correspondingly; for example, that physical portion of the molecular sieve bed which presently serves as the sorption zone becomes, successively, the secondary rectification zone, the desorption zone, and finally the primary rectification zone, whereupon the cycle is repeated.

As a matter of convenience to the present discussion and to the more particular description of the control system following, the several functional zones shall be referred to by number as indicated in FIGURE 1: the sorption zone is Zone I; the primary rectification zone is Zone IV; the desorption zone is Zone III; and the secondary rectification zone is Zone II. In addition, that portion of the desorption zone which lies between the desorbent introduction point and the flush withdrawal point is designated as Zone IIIa; and that portion of the secondary rectification zone which lies between the flush introduction point and the feed introduction point is designated as Zone IIa.

The system pressure is maintained sufficiently high to prevent flashing or sporadic vaporization of the liquid within the contacting zone at the existing process temperature. For the liquid hexane-butane system herein described, the contacting temperature may range from about 50° F. to about 300° F. and the system pressure may be from about 50 p.s.i.g. to about 500 p.s.i.g., depending upon the vapor pressure of the lowest boiling component present, in this case n-butane. For example, with a liquid temperature of 200° F., it is preferable to maintain a minimum system pressure of about 220 p.s.i.g. The feed and desorbent streams are preheated to the desired temperature by suitable heat exchanger means or fired heaters and the contacting column or columns are preferably well insulated in order to achieve substantially isothermal conditions within the contacting zone.

The sorbate product stream leaving the unit through transport conduit 132 may be sent to a sorbate fractionating column from which substantially pure n-hexane is recovered as a bottoms product and n-butane is taken overhead; the raffinate product stream which is withdrawn from the unit through transport conduit 134 may be sent to a raffinate fractionator from which isohexanes are withdrawn as a bottoms product and n-butane is taken overhead. The net overhead streams from these two fractionators may then be combined and returned to transport conduit 133 for use as desorbent.

II. Operation of the control system

Since there are four process streams entering and leaving the closed flow path, i.e., feed and desorbent in and sorbate and raffinate out, the process may be kept in material balance by flow-controlling three of the four process streams and throttling the fourth in order to maintain back pressure in the contacting zone. The pump around flow through the closed flow path can be independently varied without affecting the overall material balance. Although theoretically any three process streams may be flow-controlled, design considerations inherent in this selective sorption process make it desirable that the feed and desorbent flows be fixed; therefore, these incoming streams are flow-controlled and either or both of the two product streams are throttled to provide trim control. Other operating variables which may be considered fixed for a given separation are system temperature, pressure and the rotation rate of stream distributing valve 106. There remain, then, three variables which may be adjusted either singly or in combination to maximize the separation efficiency of the process: the pumparound flow rate, the sorbate flow rate and the raffinate flow rate.

As shown in FIGURE 1, the flow rate of the feed stream entering through transport conduit 131 is controlled by a flow control loop comprising flow controller 170 and motor valve 171. The flow rate of the sorbate stream leaving through transport conduit 132 is controlled by a flow control loop comprising flow controller 167 and motor valve 169. The flow rate of the desorbent stream entering through transport conduit 133 is controlled by a flow control loop comprising flow controller 172 and motor valve 173. The pressure of the fluid-solid contacting zone is controlled by pressure controller 174 and motor valve 175 which throttles the raffinate stream leaving through transport conduit 134 in order to hold said pressure constant. The flow rate of the pumparound stream is controlled by a flow control loop comprising flow controller 163 and motor valve 105. It is contemplated that the several controllers will be selected from conventional, commercially available instruments utilizing pneumatic, electronic or hydraulic signals which may be analog or digital in nature. Alternatively, any or all of these secondary flow control loops may be replaced with other types of flow-regulating means such as a variable-stroke, controlled volume pump, or a simple motor valve with positioner, or a pump spillback to suction or other means known to those skilled in the art.

The heart of the instant control system is the setpoint computer, which is indicated diagrammatically as block 180 in FIGURE 1 and which will be described in detail later in connection with FIGURES 5a to 5d. For the present it will suffice to explain its function. Computer 180 consists of two sections—the P-loop computer section and the N-loop computer section. Briefly stated, the P-loop computer section receives (1) flow rate information from a plurality of the process streams entering and leaving the system and from the flush stream and (2) state-of-operating cycle information from the stream distributing means, computes a setpoint signal in accordance with this input information such that the flow rate within a selection one of Zones I, IIa, II, III, IIIa and IV is maintained constant irrespective of the instantaneous location of the points of entry and exit of the various process streams along the contacting zone, and transmits the setpoint signal to pumparound flow controller 163. The N-loop computer section receives an appropriate signal representative of fluid composition at a given point within a selected one of Zones I, IIa, II, III, IIIa and IV and periodically adjusts the flow rate of one of the product streams in order to maintain the measured composition at a predetermined level.

The input information to the P-loop computer section is obtained as follows: the feed flow is sensed by turbine flowmeter 147 disposed in line 131. The turbine flowmeter generates a digital signal or pulse train such that the pulse frequency is proportional to volumetric flow rate, or, equivalently, its calibration factor may be expressed as $x$ number of pulses per fluid volume unit. Its output signal is substantially insensitive to changes in fluid specific gravity or temperature and is directly compatible with the digital circuitry receiving it. The output signal of flowmeter 147 is transmitted to computer 180 by line 146. The desorbent flow is sensed by turbine flowmeter 149 disposed in line 133 and its flow signal is transmitted to computer 180 by line 148. The sorbate flow is sensed by turbine flowmeter 151 disposed in line 132 and its flow signal is transmitted to computer 180 by line 150. The digital output signal from flowmeter 151 is also transmitted to pulse rate converter 168, which is a digital-to-analog converter producing a voltage or current signal the magnitude of which is proportional to the input pulse frequency; the output of pulse rate converter 168 is transmitted to sorbate flow controller 167. Controller 167 receives its input flow information in this manner rather than from a more conventional orifice type transmitter so that the sorbate flow control loop may operate with linear signals in order to be linearly matched to the N-loop computer logic, as hereinafter explained. The flush flow is sensed by turbine flowmeter 153 and its flow signal is transmitted via line 152 to computer 180. The flow rate information provided by flowmeters 147, 149, 151 and 153 is entirely adequate for the computer to solve any of the various volumetric balance equations which define the flow system at any given instant of time, as hereinafter explained. The state-of-operating cycle information is provided by P-loop stepping switch 155 actuated by linkage 158, which may comprise a plurality of cam members attached to shaft 145 or to rotor 137 of distributing valve 106. Stepping switch 155 applies a momentary ground at the appropriate time to one of six leads which are embraced collectively within line 154 and which are in turn connected to six "phase storage" input terminals of computer 180.

The computed setpoint signal is transmitted by line 162 to flow controller 163. The pumparound flow in line 104 is sensed by turbine flowmeter 165 the digital output of which is fed to pulse rate converter 164 which in turn supplies an analog voltage or current signal to flow controller 163. Flow controller 163 receives its input flow information in this manner rather than from an orifice type transmitter so that the pumparound flow control loop may operate with linear signals in order to be linearly matched to the P-loop computer logic.

Instead of the turbine flowmeter-pulse rate converter systems, alternative means of linearizing the pumparound and sorbate flow control loops include the use of a rotometer primary measuring element, or an orifice type transmitter the output signal of which is fed to a square root extractor which in turn transmits its signal to its respective controller.

The operation of the P-loop computer will be more clearly understood upon reference to FIGURES 3a–3f, which illustrate in sequence the six possible orientations of inflowing and outflowing streams occurring during one operating cycle in the process flow diagram of FIGURE 1 which give rise to the volumetric balance equations which are definitive of the state of the process as viewed by the setpoint computer. In FIGURES 3a–3f, $f_1$ represents the charged flush stream having a flow of $f$ volume units/unit of time, $f_o$ represents the withdrawn flush stream also having a flow of $f$ volume units/unit of time, F represents the feed stream having a flow of F volume units/unit of time, $i$ represents the raffinate stream having a flow of $i$ volume units/unit of time, D represents the desorbent stream having a flow of D volume units/unit of time, and $n$ represents the sorbate stream having a flow of $n$ volume units/unit of time. The Roman numerals indicate and correspond with the six functional zones of FIGURE 1. The pumparound flow-regulating means comprises motor valve 105 and flow controller 163 which receives a setpoint signal P from the computer via line 162. For the purposes of this discussion it is assumed that controller 163 receives its pumparound flow signal from a flow transmitter which is located in line 104. However, it is within the scope of this invention to measure the pumparound flow at a point in the closed flow path which is remote from motor valve 105; that is, it is not essential to the validity of the volumetric balance equations hereinafter derived that the final control element be in the same equilibrium zone as the primary measuring element. Thus, for example, where contacting zone 101 physically comprises four separate serially connected columns, it is perfectly feasible to place the primary measuring element (transmitter 165) between the first and second columns and to place the final control element (motor valve 105) between the third and fourth columns. The important consideration is what zone the pumparound flow primary measuring element "sees" at any instant of time. Where the pumparound flow-regulating means is not a secondary control loop as such, but rather some other type of flow-regulating means such as a motor valve with positioner or a variable stroke, controlled volume pump, these alternative types of flow-regulating means not involving an actual flow measurement, then the important consideration is what zone is passing through the flow-regulating means at any instant of time. In FIGURES 3a–3f, the direction of the pumparound flow is counterclockwise and the direction in which the inflowing and outflowing streams are shifted, proceeding sequentially from FIGURE 3a to FIGURE 3f, is also counterclockwise.

The P-loop computer may readily be programmed to maintain constant the flow rate within that portion of the contacting zone which lies between a selected pair of adjacent process streams, e.g., the flow rate of a selected one of Zones I, IIa, II . . . IV. Consider first that it is desired to control the flow of Zone II which is that portion of the contacting zone between the charged flush and sorbate product streams. Looking first at the configuration of FIGURE 3a, it may be seen that flow controller 163 presently "sees" the Zone II flow. Assume that the desired Zone II flow is to be K volume units/unit of time. It is obvious, then, that setpoint signal P must have a magnitude equal to K so long as flow controller 163 sees the Zone II flow in order that controller 163 can maintain the Zone II flow at this level. By taking a material balance around the flow path, the flows in the remaining five zones are now expressable in terms of the flows of three of the four process streams—feed, desorbent and sorbate—and of the flush stream and of Zone II or K. It is to be noted that this particular selective sorption process is substantially isothermal and involves no molecular changes so that the volumetric flows are substantially additive and a volumetric balance is equivalent to a mass flow balance. However, the present invention may readily be adapted to systems where volumetric flows are not additive by incorporating specific gravity compensation into the respective flow measurements and computing the proper setpoint on the basis of a mass flow material balance. The flows in the six zones are summarized in Table I below:

TABLE I

| Zone: | Flow |
|---|---|
| II | K. |
| III | $K+n$. |
| IIIa | $K+n+f$. |
| IV | $K+n+f-D$. |
| I | $K+f+F$. |
| IIa | $K+f$. |

Since the flow rate of the raffinate stream is not sensed, $i$ does not appear in these equations but instead is derived from the relation that the sum of the inflowing streams must equal the sum of the outflowing streams; $i$ is therefore expressable in terms of the flows of the feed, desorbent and sorbate streams, to wit:

$$i = F + D - n$$

The computer will hold the setpoint signal at $P=K$ until such time as the sorbate product stream "traverses" the pumparound flow-regulating means; the term "traversal" is defined herein as the shift in the point of introduction or withdrawal of an inflowing or outflowing stream from a transfer point immediately upstream from the pumparound flow-regulating means—or from the pumparound flow-measuring point if the latter is in a different zone than the final control element—to a transfer point immediately downstream from said flow-regulating means or flow-measuring point.

Figure 3A:
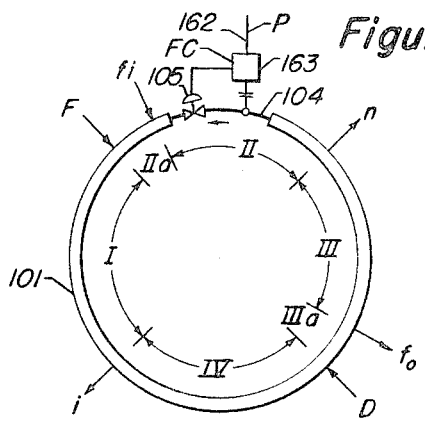
FIGURES 3a–3f illustrate the various phases of the fluid separation process of FIGURE 1, e.g., the several orientations of the process streams relative to the flow-regulating means occurring during one operating cycle, which give rise to the volumetric balance equations which are definitive of the state of the process.
Figure 3D:
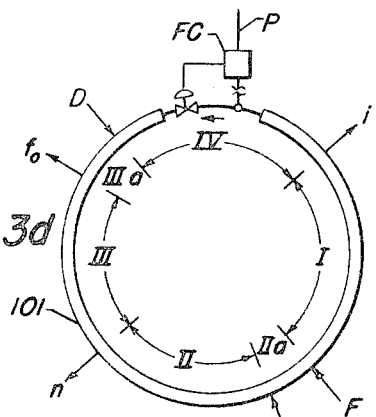
Figure 3B:
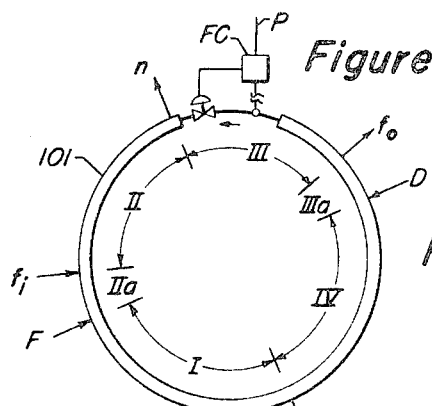

Upon traversal of the flow-regulating means by the sorbate product stream $n$, the configuration of FIGURE 3b obtains and controller 163 now sees the Zone III flow which from Table I is seen to be equal to $K+n$. The setpoint signal P must now have a magnitude equal to $K+n$ so long as controller 163 sees the Zone III flow in order that controller 163 can maintain the Zone II flow at its original level of K flow units. The change in setpoint equation which is called for in proceeding from FIGURE 3a to FIGURE 3b, for example, is accomplished by changing the program of computer 180 which in turn is effected by P-loop stepping switch 155 which applies a momentary grounding pulse to the appropriate phase storage input terminal of computer 180.

Figure 3E:
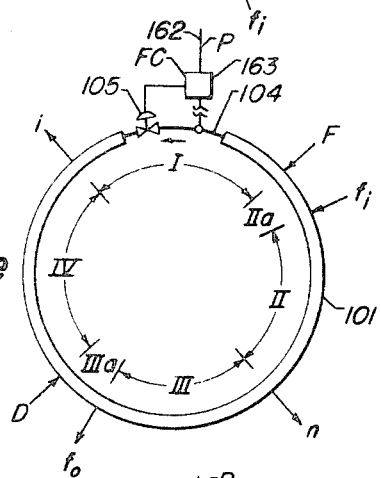
Figure 3C:
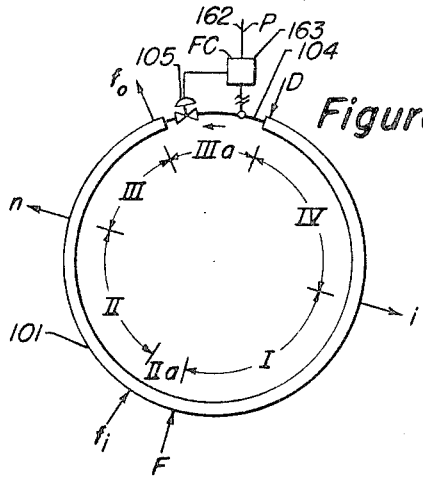

Upon traversal of the flow-regulating means by the withdrawn flush stream $f_o$, the configuration of FIGURE 3c obtains and controller 163 now sees the Zone IIIa flow which from Table I is seen to be equal to $K+n+f$. The setpoint signal P must now have a magnitude equal to $K+n+f$ so long as controller 163 sees the Zone IIIa flow in order that controller 163 can maintain the Zone II flow at its original level of K flow units.

Upon traversal of the flow-regulating means by the desorbent stream D, the configuration of FIGURE 3d obtains and controller 163 now sees the Zone IV flow which from Table I is seen to be equal to $K+n+f-D$. The setpoint signal P must now have a magnitude equal to $K+n+f-D$ so long as controller 163 sees the Zone IV flow in order that controller 163 can maintain the Zone II flow at its original level of K flow units.

Upon traversal of the flow-regulating means by the raffinate stream $i$, the configuration of FIGURE 3e obtains and controller 163 now sees the Zone I flow which from Table I is seen to be equal to $K+f+F$. The setpoint signal P must now have a magnitude equal to $K+f+F$ so long as controller 163 sees the Zone I flow in order that controller 163 can maintain the Zone II flow at its original level of K flow units.

Figure 3F:
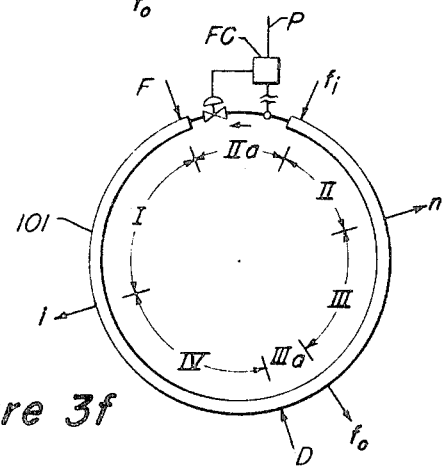

Upon traversal of the flow-regulating means by the feed stream F, the configuration of FIGURE 3f obtains and controller 163 now sees the Zone IIa flow which from Table I is seen to be equal to $K+f$. The setpoint signal P must now have a magnitude equal to $K+f$ so long as controller 163 sees the Zone IIa flow in order that controller 163 can maintain the Zone II flow at its original level of K flow units.

This completes one operating cycle using Zone II flow control. Upon traversal of the flow-regulating means by charged flush stream $f_1$, the configuration of FIGURE 3a obtains whence the cycle is repeated. The six phases of the P-loop computer for Zone II control are summarized in Table II below:

TABLE II

| Controller 163 sees: | Magnitude of P |
|---|---|
| Zone II flow | K. |
| Zone III flow | $K+n$. |
| Zone IIIa flow | $K+n+f$. |
| Zone IV flow | $K+n+f-D$. |
| Zone I flow | $K+f+F$. |
| Zone IIa flow | $K+f$. |

It may be seen that the Zone II flow rate is held constant irrespective of the instantaneous physical position of the various inflowing and outflowing streams relative to the flow-regulating means and irrespective of variations in the flow rates of the inflowing and outflowing streams.

Figure 4:
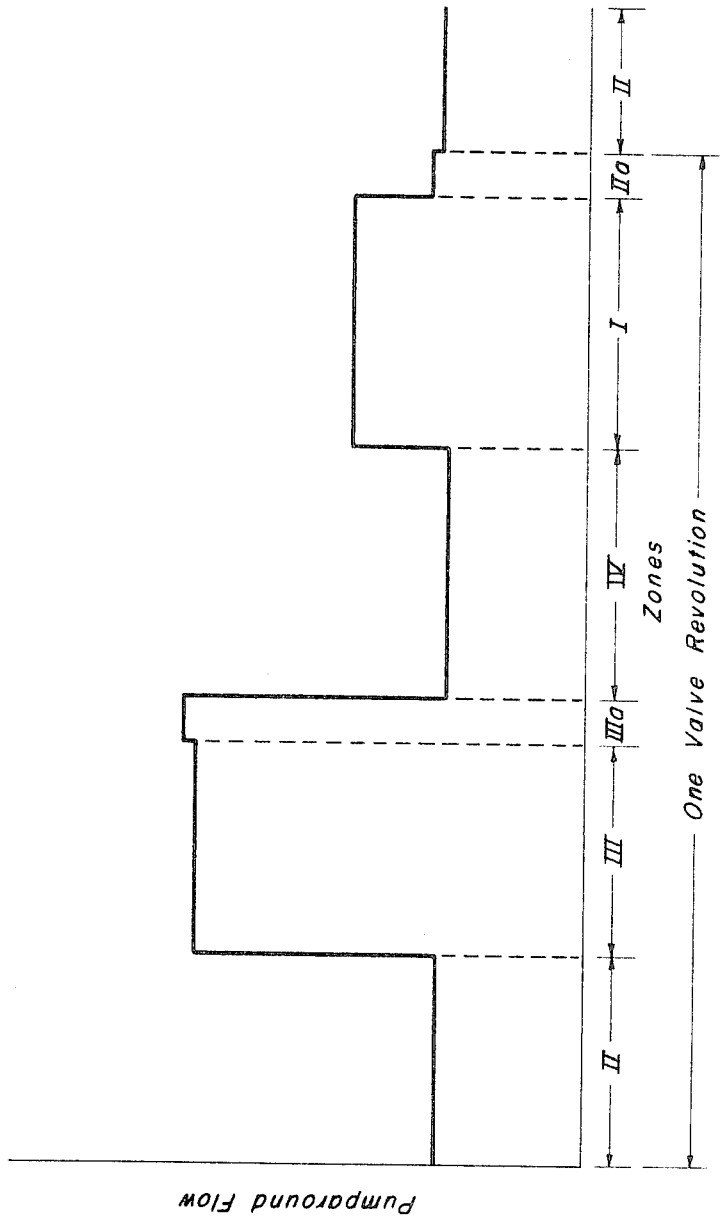
FIGURE 4 is a graph showing variation of pumparound flow rate as a function of sorbent bed length, or alternatively of time, when the process is properly controlled in accordance with the method of this invention.

The graph of FIGURE 4 illustrates the various levels of pumparound flow as a function of sorbent bed length when the process is being operated under Zone II flow control.

Before proceeding with the derivation of the several alternative sets of volumetric balance equations which characterize the control of Zones I, III and IV, it will be advantageous at this time to develop a general setpoint equation which is valid for any number and configuration of inflowing and outflowing streams, since the present invention is not at all limited to a particular 4-zone or 6-zone process but, as will be apparent to those skilled in the art, its sphere of application extends to any geometrically similar system cahracterized by continuously circulating a fluid through a closed flow path wherein at least one inflowing stream is charged to the flow path and at least one outflowing stream is withdrawn therefrom. For example, it may be desirable to charge feed and/or desorbent through two or more spaced transfer points, or to withdraw three or more product streams, or to use two or more flush streams, or to obtain the flush stream from an extraneous source—any of which flow schemes will result in different equations than apply in the specific six-zone process hereinabove discussed.

In general, then, there may be a plurality of $r$ inflowing and outflowing streams, the flows of at least $r-1$ of which are sensed and transduced to signal form for use by the setpoint computer. It being required that the flow within that portion of the closed flow path which lies between a selected pair of inflowing and/or outflowing streams be controlled at a level K, the generalized setpoint equation is given by:

$$P = K + A$$

where A is a function of the number, direction and flow rates of the process streams passing through those transfer points which are located between the pumparound flow-regulating means and the one of said pair of streams which is more remote from the flow-regulating means, the term "remote" meaning the farther downstream one if we proceed in a downstream direction around the flow path from the flow-regulating means, or the farther upstream one if we proceed in an upstream direction around the flow path from the flow-regulating means. In other words, A is the algebraic summation of the flow rates of all inflowing and/or outflowing process streams encountered by either of two routes:

(1) between the flow-regulating means and the more downstream of said pair of streams, proceeding downstream around said flow path from the flow-regulating means, or (2) between the flow-regulating means and the more upstream of said pair of streams, proceeding upstream around the flow path from the flow-regulating means.

In both cases due regard must be had for the signs (+ or −) to be given the flow rates of the streams in making said summation. In route (1), supra, the inflowing or entering streams are given a minus sign and the outflowing or leaving streams are given a plus sign; in route (2), supra, the inflowing or entering streams are given a plus sign and the outflowing or leaving streams are given a minus sign. The equations derived from either route are completely equivalent and if the flows of all of said $r$ streams are sensed for utilization by the computer, it is immaterial by which route we proceed. However, material balance considerations make it necessary to sense the flows of only $r-1$ streams for utilization by the computer, as a minimum requirement, which leaves one stream whose flow is unsensed and hence not available for computation of A. Here, then, the equations are derived according to route (1) if the unsensed stream would be encountered by route (2), and according to route (2) if the unsensed stream would be encountered by route (1). It is, of course, immaterial to the instant control system whether the unsensed stream is an inflowing stream or an outflowing stream. The foregoing rules may be summarized as follows: given a group of flow signals corresponding to the flow rates of $r-1$ process streams being unsensed, it being required that the pumparound flow between a selected pair of process streams be controlled, then A is computed from said group of flow signals such that (1) whenever the unsensed process stream passes through a transfer point between either of said pair of process streams and the flow-regulating means, proceeding downstream along the closed flow path toward the latter, then $$A = S_L^1 - S_E^1 \quad \text{(Eq. 1)}$$

where $S_L^1$ = sum of the flow rates of all streams leaving the flow path between the downstream one of said pair of streams and the flow-regulating means, proceeding upstream along the flow path toward the latter, and $S_E^1$ = sum of the flow rates of all streams entering the flow path between the downstream one of said pair of streams and the flow-regulating means, proceeding upstream along the flow path toward the latter; and (2) whenever the unsensed process stream passes through a transfer point between either of said pair of streams and the flow-regulating means, proceeding upstream along the flow path toward the latter, then $$A = S_E^2 - S_L^2 \quad \text{(Eq. 2)}$$

where $S_E^2$ = sum of the flow rates of all streams entering the flow path between the upstream one of said pair of streams and the flow-regulating means, proceeding downstream along the flow path toward the latter, and $S_L^2$ = sum of flow rates of all streams leaving the flow path between the upstream one of said pair of streams and the flow-regulating means, proceeding downstream along the flow path toward the latter.

Let us apply this generalized expression to a specific situation, specifically Zone II flow control as was earlier developed from a material balance. With reference again to FIGURES 3a–3f, the "selected pair of streams" is the charged flush stream $f_i$ and the sorbate product stream $n$, the former being the "downstream one of said pair" and the latter being the "upstream one of said pair." The raffinate stream $i$ is the "unsensed" stream. In FIGURE 3a, there are no streams entering or leaving the flow path either between stream $f_i$ and controller 163, proceeding upstream along the flow path toward the latter, or between stream $n$ and controller 163, proceeding downstream along the flow path toward the latter. Therefore, $$S_L^1 = S_E^1 = S_L^2 = S_E^2 = 0$$
$$A = 0$$

and $$P = K$$

In FIGURE 3b, unsensed raffinate stream $i$ passes through a transfer point between charged flush stream $f_i$ and controller 163, proceeding downstream along the flow path toward the latter, so that Equation 1 applies:

$$A = S_L^1 - S_E^1$$

Outflowing sorbate product stream $n$ is the only stream encountered between charged flush stream $f_i$, proceeding upstream along the flow path, and controller 163; therefore, $$S_L^1 = n$$
$$S_E^1 = 0$$

and $$P = K + n$$

In FIGURE 3c, Equation 1 still applies:

$$A = S_L^1 - S_E^1$$

Outflowing sorbate product stream $n$ and withdrawn flush stream $f_o$ are encountered between charged flush stream $f_i$, proceeding upstream along the flow path, and controller 163; therefore, $$S_L^1 = n + f$$
$$S_E^1 = 0$$

and $$P = K + n + f$$

In FIGURE 3d, Equation 1 still applies:

$$A = S_L^1 - S_E^1$$

Outflowing sorbate product stream $n$, withdrawn flush stream $f_o$, and inflowing desorbent stream D are encountered between charged flush stream $f_i$, proceeding upstream along the flow path, and controller 163; therefore, $$S_L^1 = n + f$$
$$S_E^1 = D$$

and $$P = K + n + f - D$$

In FIGURE 3e, the unsensed raffinate stream $i$ passes through a transfer point between charged flush stream $f_i$ and controller 163, proceeding upstream along the flow path toward the latter, so that Equation 2 now applies:

$$A = S_E^2 - S_L^2$$

Charged flush stream $f_i$ and inflowing feed stream F are encountered between sorbate product stream $n$, proceeding downstream along the flow path, and controller 163; therefore, $$S_E^2 = f + F$$
$$S_L^2 = 0$$

and $$P = K + f + F$$

In FIGURE 3f, Equation 2 still applies:

$$A = S_E^2 - S_L^2$$

Charged flush stream $f_i$ is the only stream encountered between sorbate product stream $n$, proceeding downstream along the flow path, and controller 163; therefore, $$S_E^2 = f$$
$$S_L^2 = 0$$

and $$P = K + f$$

The general setpoint equation may be applied to derive the volumetric balance equations for Zone IV flow control in the same manner. With reference again to FIGURES 3a–3f, the "selected pair of streams" is now the desorbent stream D and the raffinate stream $i$, the former being the "downstream one of said pair" and the latter being the "upstream one of said pair." Again, the raffinate stream $i$ is the "unsensed" stream. Referring first to FIGURE 3d, there are no streams entering or leaving the flow path either between stream D and controller 163, proceeding upstream along the flow path toward the latter, or between stream $i$ and controller 163, proceeding downstream along the flow path toward the latter; therefore, $$S_L^1 = S_E^1 = S_L^2 = S_E^2 = 0$$
$$A = 0$$

and $$P = K$$

In FIGURE 3e, unsensed stream $i$ passes through a transfer point between desorbent stream D, proceeding upstream along the flow path, and controller 163; therefore, Equation 2 applies:

$$A = S_E^2 - S_L^2$$

Inflowing desorbent stream D, withdrawn flush stream $f_o$, sorbate product stream $n$, charged flush stream $f_i$, and feed stream F are encountered between raffinate stream $i$, proceeding downstream along the flow path, and controller 163; therefore, $$S_E^2 = D + f + F$$
$$S_L^2 = f + n$$

and $$P = K + D - n + F$$

In FIGURE 3f, Equation 2 still applies:

$$A = S_E^2 - S_L^2$$

Inflowing desorbent stream D, withdrawn flush stream $f_o$, sorbate product stream $n$, and charged flush stream $f_i$ are encountered between raffinate stream $i$, proceeding downstream along the flow path, and controller 163; therefore, $$S_E^2 = D + f$$
$$S_L^2 = f + n$$

and $$P = K + D - n$$

In FIGURE 3a, Equation 2 still applies:

$$A = S_E^2 - S_L^2$$

Inflowing desorbent stream D, withdrawn flush stream $f_o$, and sorbate product stream $n$ are encountered between raffinate stream $i$, proceeding downstream along the flow path, and controller 163; therefore, $$S_E^2 = D$$
$$S_L^2 = f + n$$

and $$P = K + D - f - n$$

In FIGURE 3b, Equation 2 still applies:

$$A = S_E^2 - S_L^2$$

Inflowing desorbent stream D and withdrawn flush stream $f_o$ are encountered between raffinate stream $i$, proceeding downstream along the flow path, and controller 163; therefore, $$S_E^2 = D$$
$$S_L^2 = f$$

and $$P = K + D - f$$

In FIGURE 3c, Equation 2 still applies:

$$A = S_E^2 - S_L^2$$

Inflowing desorbent stream D is the only stream encountered between raffinate stream $i$, proceeding downstream along the flow path, and controller 163; therefore, $$S_E^2 = D$$
$$S_L^2 = 0$$

and $$P = K + D$$

The volumetric balance equations for the flow control of any of the other zones, e.g., Zones I, IIa, III and IIIa, may be developed in an analogous manner. The derivations will not be given here as the foregoing is adequate to demonstrate the application of the general setpoint equation to a specific process configuration. The six phases of the P-loop computer when programmed to control the flow respectively of Zones I, II, III and IV are summarized in Table III:

TABLE III

| Point of Pumparound Flow Regulation and/or Measurement sees Flow of Zone | Magnitude of P | | | |
|---|---|---|---|---|
| | Zone I Control | Zone II Control | Zone III Control | Zone IV Control |
| I | K | K+f+F | K+f−n+F | K+D−n+F |
| IIa | K−F | K+f | K+f−n | K+D−n |
| II | K−F−f | K | K−n | K+D−f−n |
| III | K−F−f+n | K+n | K | K+D−f |
| IIIa | K−F+n | K+n+f | K+f | K+D |
| IV | K−F+n−D | K+n+f−D | K+f−D | K |

In some instances it may be desirable to omit the flush flow $f$ from the volumetric balance equations, as where the magnitude of the flush flow is too low in comparison with the other streams to warrant setpoint computation for Zones IIa and IIIa, or where the flushing function is performed by periodic high velocity, short time pulses of flush fluid instead of a continuously flowing flush stream of relatively low flow, or where the flush stream is dispensed with altogether. In such case, the equations of Table III are still valid except that $f$ is set equal to zero wherever it appears in the equations and Zones IIa and IIIa are deleted. Such variation may be physically accomplished by omitting flush flow meter 153 (FIGURE 1) and programming the P-loop computer so that it operates with four phases instead of six whereby setpoint signal P is computed according to a different one of four equations successively upon traversal of the pumparound flow-regulating means by the feed stream, sorbate product stream, desorbent stream and raffinate product stream.

Changes in the flow rates of the feed, desorbent, sorbate and flush streams may affect the flows in the several zones differently in accordance with whether the P-loop computer is programmed to control Zone I, Zone II, Zone III or Zone IV. Tables IV, V, VI and VII given below demonstrate the effect on the flow in each of the six zones produced by changes in the flow rates of the feed, desorbent, sorbate and flush streams for Zone I, Zone II, Zone III and Zone IV flow control, respectively. The raffinate stream being allowed to vary responsive to system pressure, the flow rate thereof is not an independent variable.

TABLE IV.—ZONE I FLOW CONTROL

| Increase Flow of— | Effect on Flow in Zones | | | | | |
|---|---|---|---|---|---|---|
| | I | IIa | II | III | IIIa | IV |
| Feed | | Decrease | Decrease | Decrease | Decrease | Decrease |
| Desorbent | | | | | | Decrease |
| Sorbate | | | | Increase | Increase | Increase |
| Flush | | | Decrease | Decrease | | |

TABLE V.—ZONE II FLOW CONTROL

| Increase Flow of— | Effect on Flow in Zones | | | | | |
|---|---|---|---|---|---|---|
| | I | IIa | II | III | IIIa | IV |
| Feed | Increase | | | | | |
| Desorbent | | | | | | Decrease |
| Sorbate | | | | Increase | Increase | Increase |
| Flush | Increase | Increase | | | Increase | Increase |

TABLE VI.—ZONE III FLOW CONTROL

| Increase Flow of— | Effect on Flow in Zones | | | | | |
|---|---|---|---|---|---|---|
| | I | IIa | II | III | IIIa | IV |
| Feed | Increase | | | | | |
| Desorbent | | | | | | Decrease. |
| Sorbate | Decrease | Decrease | Decrease | | | |
| Flush | Increase | Increase | | | Increase | Increase. |

TABLE VII.—ZONE IV FLOW CONTROL

| Increase Flow of— | Effect on Flow in Zones | | | | | |
|---|---|---|---|---|---|---|
| | I | IIa | II | III | IIIa | IV |
| Feed | Increase | | | | | |
| Desorbent | Increase | Increase | Increase | Increase | Increase | |
| Sorbate | Decrease | Decrease | Decrease | | | |
| Flush | | | Decrease | Decrease | | |

It may be seen from inspection of Tables IV–VII, supra, that with Zone I control an increase in feed rate will cause a decrease in the flows of all zones except Zone I, whereas with Zone II, Zone III or Zone IV control, a change in feed rate will affect only Zone I. With Zone IV control, an increase in desorbent rate will cause an increase in the flows of all zones except Zone IV, whereas with Zone I, Zone II or Zone III control, a change in desorbent rate will affect only Zone IV. With Zone I or Zone II control, an increase in sorbate rate will increase the flows of Zones III, IIIa and IV and will not affect the other zones, whereas with Zone III or Zone IV control, an increase in sorbate rate will decrease the flows of Zones I, IIa and II and will not affect the other zones.

The practical significance of these observations is that the effect of stream flow rates on separation efficiency is readily apparent. Assuming the feed rate to be constant, the rotation rate of the rotary valve and the desorbent rate are maintained sufficiently high so that Zones I and III are not critical from a separation control standpoint; no harm is done if these two rates are somewhat higher than necessary. The flush rate is also maintained constant. The critical zones are II and IV, the compositions of which determine the sorbate and raffinate product purities. If the Zone II flow is too low, feed issues with sorbate; if the Zone II flow is too high, sorbate components issue with raffinate. If the Zone IV flow is too low, excess desorbent issues with raffinate, instead of being displaced into Zone III where needed; if the Zone IV flow is too high, raffinate components issue with sorbate. It is preferred, therefore, to program the P-loop computer for either Zone II or Zone IV flow control, and to vary one of the two product streams in order to maintain the fluid composition at a selected point within either Zone II or Zone IV at a predetermined value. For example, with the P-loop computer programmed for Zone II flow control, the raffinate stream is varied to maintain constant the Zone IV composition, the sorbate product stream being removed on pressure control; and with the P-loop computer programmed for Zone IV flow control, the sorbate product stream is varied to maintain constant the Zone II composition while the raffinate stream is withdrawn on pressure control. These operational techniques will be discussed more fully in connection with the N-loop computer section.

If, for example, the P-loop computer is programmed for Zone IV flow control with the raffinate product stream being withdrawn on pressure control, there are four major operating adjustments which may be made to maximize the separation efficiency of the selective sorption process, reference now being made to Table VII, supra;

(1) If the feed rate is increased, the concentration of normal components in Zone I will be too high. This may be compensated for by increasing the valve rotation rate and then increasing Zone IV flow K, desorbent flow D and sorbate flow $n$, all in equal amounts. The flows in all zones will increase by $\Delta K$, and the Zone III flow will increase additionally by $\Delta D$. This will decrease the concentration of normal components in Zone I with no effect on the other zones.

(2) If the concentration of iso components in Zone II should be too high, the sorbate flow $n$ is decreased which will increase the flows in Zones I and II by $\Delta n$. The principal effect is to decrease the concentration of iso components in Zone II; the concentration of normal components will increase slightly in Zone I but this is not critical.

(3) If the concentration of normal components in Zone III should be too high, desorbent flow D and sorbate flow $n$ are increased in equal increments which will increase only the Zone III flow by $\Delta D$. This decreases the concentration of normal components in Zone III with no effect on the other zones.

(4) If the concentration of iso components in Zone IV should be too high, the Zone IV flow K is decreased and desorbent flow D is increased by the same increment, which will decrease only the Zone IV flow by $-\Delta K$. This decreases the concentration of iso components in Zone IV with no effect on the other zones.

Similar operating criteria may be derived for Zone II flow control, etc. Once the selective sorption process is on stream and lined out, only adjustment (2), supra, is necessary to assure maximum separation efficiency. This is advantageously carried out by automatic means, specifically the N-loop computer section.

With reference again to FIGURE 1, the N-loop computer section receives its information as follows: fluid composition is sensed by a suitable composition sensing device such as dielectric constant probe 161 disposed in line 104; the measured dielectric constant increases with increasing concentration of branched chain and/or cyclic hydrocarbons and thus provides a simple index of the iso/normal ratio which is adequate for control purposes. Alternatively, other composition sensing means may be employed such as a differential refractometer or chromatograph. A dielectric constant signal is transmitted to composition controller 160 which may be a variable gain proportional amplifier having a variable setpoint and which produces an error signal proportional to the difference between the setpoint and dielectric constant signals. The error signal is transmitted via line 159 to computer 180. The dielectric constant signal will have significance for control purposes only when it is taken at the same point in the same zone since at any given instant of time the iso/normal ratio varies with distance along the molecular sieve bed. Therefore, the N-loop computer does not act in response to the error signal until dielectric constant probe 161 "sees" the same point in the same zone as it did in the preceding cycle of operation. Such state-of-operating cycle information is provided by N-loop trigger switch 157 actuated by linkage 158, which may comprise a cam member attached to shaft 145 or to rotor 137 of distributing valve 106. Trigger switch 157 applies a momentary grounding pulse at the appropriate time to line 156 which in turn is connected to an N-loop correction control initiating circuit in computer 180. In the particular embodiment illustrated in FIGURE 1, the dielectric constant measurement is taken in the midzone of Zone II, the iso/normal ratio therein being responsive to changes in the sorbate product flow rate. Upon receiving an N-loop triggering signal via line 156, the N-loop computer produces a setpoint signal proportional to the error signal presently received on line 159 and transmits a setpoint signal via line 166 to reset sorbate flow controller 167. The overall control action is such that the sorbate flow is varied in a direction—increasing flow or decreasing flow—which tends to reduce the dielectric constant error signal substantially to zero, i.e., to restore the iso/normal ratio to the control point as called for by composition controller 160. If the measured dielectric constant is too high, indicating too high a concentration of iso components in Zone II, the sorbate flow is decreased; if the measured dielectric constant is too low, indicating too low a concentration of iso components in Zone II, the sorbate flow is increased. Computer 180 includes an "N" setpoint register which stores the N-loop setpoint signal and continuously applies it to flow controller 167 until a new N-loop correction is called for by trigger switch 157 in the next cycle of operation. If the error signal appearing on line 159 is substantially zero, or below a predetermined minimum, computer 180 takes no corrective action and the N-loop setpoint signal remains at the same magnitude as in the preceding cycle of operation. The N-loop control system may be characterized as a sampled input proportional controller comprising an analog proportional amplifier, an analog-to-digital-to-analog converter circuit, and an output register. This circuitry will be described more particularly in connection with FIGURES 5a–5d.

More than one composition sensing point may be employed if desired; for example, two dielectric probes spaced 180° apart, or four dielectric probes spaced 90° apart may be utilized in which case the N-loop computer would perform its setpoint correction twice per valve revolution or four times per valve revolution, as the case may be. However, a large number of composition sensing points, say, for example, one provided between each of transfer lines 107–130, would not be desirable since a finite time must elapse following a step change in the sorbate flow rate for the overall process to reach a new state of dynamic equilibrium. With an excessive number of composition-sensing points, new N-loop setpoints would be successively computed on the basis of erroneous information before the process would have a chance to stabilize, and the performance of the system as a whole might well be unstable.

III. The computer

The P-loop and N-loop setpoint computer, shown diagrammatically as block 180 in FIGURE 1, is a special purpose, variable program digital computer designed to fulfill the several objectives of this invention. It will be obvious to those skilled in the process control art that a functionally equivalent computer may be assembled from analog computing elements, and such alternative circuitry is considered to be within the scope of the present invention. However, a digital computer is preferred because of its inherent accuracy and reproducibility in making calculations; furthermore, the digital circuitry may be constructed largely of solid state components which provide superior reliability and substantially maintenance-free operation under the demands of heavy duty service encountered in a typical petroleum refinery or chemical plant.

The P-loop computer section comprises a phase storage circuit, a program counter, an up-down counter or accumulator, and a "P" setpoint register. The configuration of the phase storage circuit is responsive to contact closures of P-loop stepping switch 155, and the phase storage circuit together with the program counter determine which one of the six setpoint equations (for example, any one of the four sets of six equations each listed in Table III) is presently to be solved. The program counter also controls the sequence of steps required for a P-loop solution. Means are provided for transferring K into the accumulator, and, if the particular setpoint equation additionally includes the flow rates of one or more of the desorbent, flush, sorbate and feed streams, the pulse signals corresponding thereto are sequentially gated into the accumulator to cause it to count up or down accordingly as the algebraic sign of the flow signal in the setpoint equation is positive or negative. Means are further provided for controlling and varying the gating time of each of the flow signals into the accumulator in order to compensate for different flowmeter calibration factors: for example, 100 pulses from feed flowmeter 147 may represent one fluid gallon of feed whereas 200 pulses from desorbent flowmeter 149 may represent one fluid gallon of desorbent; in such case, the feed flowmeter gate must be held open twice as long as the desorbent flowmeter gate in order that the accumulator count produced by each be the same for equal flow rates, in other words, that the proper weighting factor be attached to the respective flow signals. After all of the required signals have been put into the accumulator, the total count stored therein is transferred to the "P" setpoint register which transmits an analog setpoint signal P via line 162 to pump around flow controller 163 and which stores P until the next successive P-loop solution is completed. The P-loop computer then repetitively calculates new P-loop solutions, as above, according to the same setpoint equation until such time as stepping switch 155 changes the configuration of the phase storage circuit whereby a new setpoint equation is to be followed. The setpoint calculation frequency is very much higher than the frequency of phase change and is determined primarily by the computer clock frequency and the usable pulse rate bandwidths of the turbine flowmeters, that is, the frequency ranges over which the turbine flowmeter outputs are linear with flow. For process control purposes a low frequency clock driven by 60 cycle line frequency is very satisfactory and provides virtually continuous P-loop computation insofar as system response is concerned since the process time constants are much greater than line frequency.

The N-loop computer section comprises an error comparator, an N-loop correction counter, an accumulator, an "N" setpoint register, and a program counter. The accumulator and program counter are the same components as are used in the P-loop computer section and are time-shared therewith. A contact closure by N-loop trigger switch 157 initiates an N-loop correction and temporarily suspends the repetitive series of P-loop solutions which is otherwise being carried out. The program counter controls the sequence of steps required for an N-loop correction. The accumulator is first cleared, the N setpoint is transferred from the "N" setpoint register into the accumulator, and the correction counter is reset to a state corresponding to a zero error signal appearing on line 159. The error comparator is a clock-driven analog-to-digital converter receiving the error signal on line 159 and a feedback signal from the correction counter and produces as its output an "up" pulse or a "down" pulse accordingly as the count stored in the correction counter is less or greater than the error signal on line 159. The error comparator pulse output is fed simultaneously to the correction counter and to the accumulator, and is continued until the count stored in the correction counter is substantially equal to said error signal. The total count now present in the accumulator, which is equal to the N setpoint calculated during the preceding N-loop solution plus or minus an error differential which is proportional to the present error, is transferred to the "N" setpoint register which transmits an analog setpoint signal N via line 166 to sorbate flow controller 167 and which stores N until the next N-loop correction is made. The P-loop computer section now resumes operation, as above.

FIGURES 5a to 5d, inclusive, represent a schematic signal flow diagram of the circuitry contained within block 180 of FIGURE 1. Only the major functional components thereof are shown, inasmuch as these are assembled from standard, commercially available circuits such as flip-flops, diode AND gates, diode OR gates, transistor inverter gates, power gates, buffer amplifiers, digital clocks, relay matrices and the like; the design of these subcomponents is well known to those skilled in the computer art and forms no part of the present invention. The interconnections between the subcomponents to form the major functional components are made in accordance with the logic equations hereinafter set forth, and the interconnections between the major components are made according to the signal flow diagram of FIGURES 5a to 5d.

It will be desirable at this point to define several of the symbols employed in the following logic equations; J and K represent, respectively, the "true" and "false" inputs of a flip flop (FF), while Q and $\bar{Q}$ represent, respectively, the "true" and "false" outputs of the flip flop; a signal present on the J input terminal coupled with a clock pulse (C) places the flip flop in its true or "up" state by activating the Q output terminal until such time as the flip flop is tripped to its false or "down" state; a signal present on the K input terminal, coupled with a clock pulse (C), places the flip flop in its down state by activating the $\bar{Q}$ output terminal until such time as the flip flop should again be tripped to its up state. Q and $\bar{Q}$ cannot, of course, exist simultaneously in the same flip flop.

AND and OR functions are represented as follows: $Q^{01}Q^{02}Q^{03}$ means $Q^{01}$ and $Q^{02}$ and $Q^{03}$, whereas $Q^{01}+Q^{02}+Q^{03}$ means $Q^{01}$ or $Q^{02}$ or $Q^{03}$. The "plus" sign as employed in the computer logic equations connotes a logical OR function and is to be distinguished from "plus" signs appearing elsewhere in the instant specification and claims, in which latter case the "plus" sign is used in its ordinary algebraic sense. A typical logic equation such as, for example, $$J^{04} = (\bar{Q}^{04}Q^{07} + Q^{07}Q^{08})C$$

is interpreted to mean that $J^{04}$ is true and therefore flip flop FF04 is set "up" upon receiving the next clock pulse (C) if either $Q^{04}$ is false and $Q^{07}$ is true, or $Q^{07}$ and $Q^{08}$ are both true. Other symbols will be defined as they appear in the logic equations.

Figure 5A:
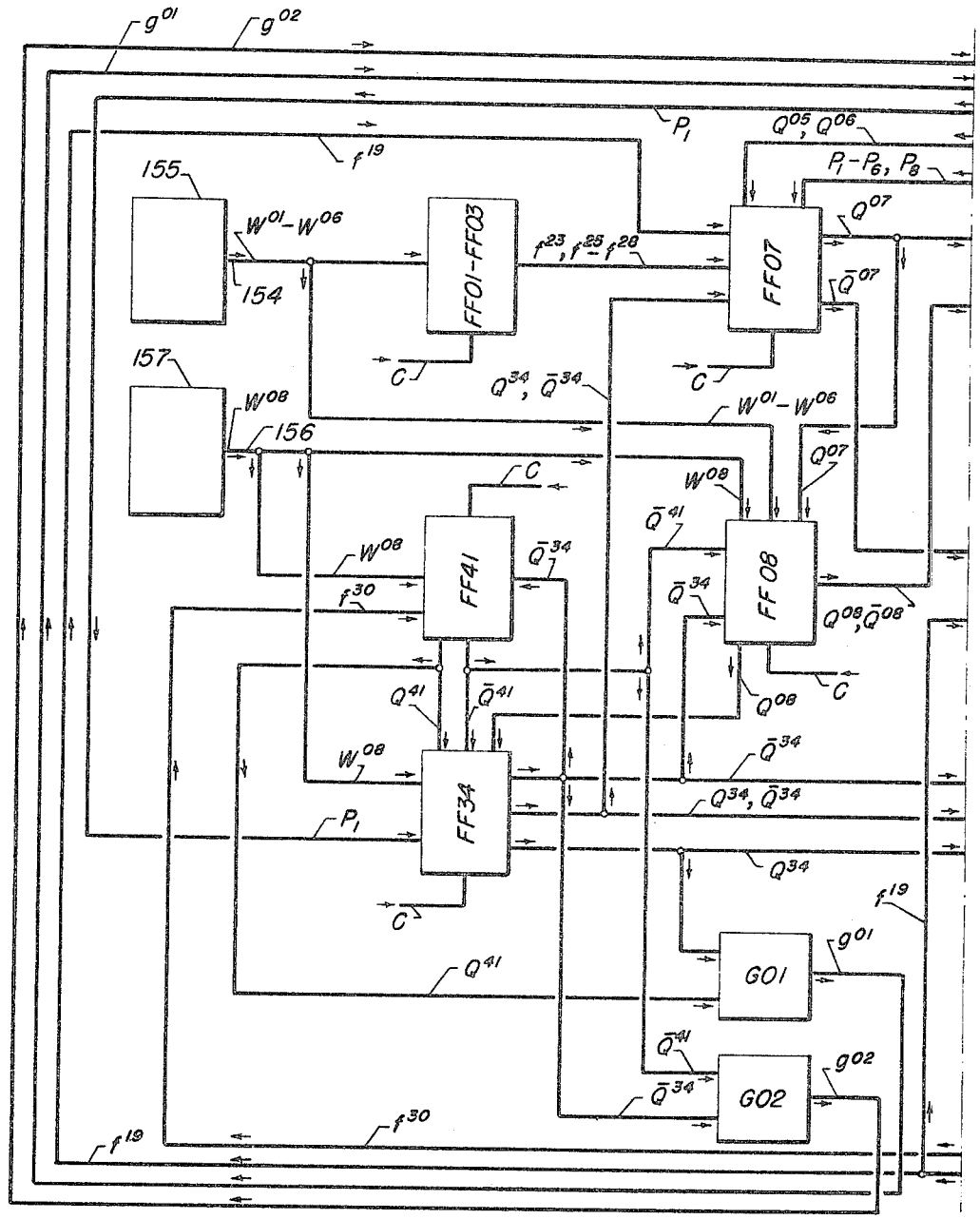

In FIGURE 5a, the phase storage circuit is a 3-bit register comprising three flip-flops FF01, FF02 and FF03, and six logical followers (logical output gates plus buffer amplifiers) F23, F24 ... F28 having outputs $f^{23}, f^{24} ... f^{28}$, respectively. The configuration of the phase storage circuit is responsive to successive momentary contact closures $W^{01}, W^{02} ... W^{06}$ of stepping switch 155, each appearing on one of six leads embraced within line 154 and signifying that a new setpoint equation is to be solved by the P-loop computer section. The phase storage flip flops are activated by clock pulses C from the 60-cycle clock (FIGURE 5). The logic equations for the phase storage circuit are given by:

$$J^{01} = (W^{02}+W^{03}+W^{06})C$$
$$K^{01} = (W^{01}+W^{04}+W^{05})C$$
$$J^{02} = (W^{04}+W^{05}+W^{06})C$$
$$K^{02} = (W^{01}+W^{02}+W^{03})C$$
$$J^{03} = (W^{01}+W^{02}+W^{04}+W^{06})C$$
$$K^{03} = (W^{03}+W^{05})C$$
$$f^{23} = \bar{Q}^{01}\bar{Q}^{02}Q^{03}$$
$$f^{24} = Q^{01}\bar{Q}^{02}Q^{03}$$
$$f^{25} = Q^{01}\bar{Q}^{02}\bar{Q}^{03}$$
$$f^{26} = \bar{Q}^{01}Q^{02}Q^{03}$$
$$f^{27} = \bar{Q}^{01}Q^{02}\bar{Q}^{03}$$
$$f^{28} = Q^{01}Q^{02}Q^{03}$$

For the purpose of providing a specific example, the P-loop computer is shown programmed for Zone II flow control, although changes to other programs are easily made. For Zone II control the significance of the six configurations of the phase storage flip flops is given by Table VIII:

TABLE VIII

| Pumparound flow controller 163 sees flow of Zone | Contact Closure of Switch 155 | Configuration of Phase Storage Circuit | Magnitude of P |
|---|---|---|---|
| IIa | $W^{01}$ | $f^{23}$ | K+f. |
| II | $W^{02}$ | $f^{24}$ | K. |
| III | $W^{03}$ | $f^{25}$ | K+n. |
| IIIa | $W^{04}$ | $f^{26}$ | K+n+f. |
| IV | $W^{05}$ | $f^{27}$ | K+n+f−D. |
| I | $W^{06}$ | $f^{28}$ | K+f+F. |

The program counter (FIGURE 5b) comprises three flip flops FF04, FF05 and FF06 and eight logical followers $P_1, P_2 ... P_8$. It is operative during both the P-loop solutions and the N-loop correction and controls the steps involved in performing a given computation. The logical equations for the program counter are given by:

$$J^{04} = (\bar{Q}^{04}Q^{07} + Q^{07}Q^{08})C$$
$$K^{04} = Q^{04}Q^{07}\bar{Q}^{08}C$$
$$J^{05} = Q^{04}\bar{Q}^{05}Q^{07}\bar{Q}^{08}C$$
$$K^{05} = (Q^{04}Q^{05}+Q^{08})Q^{07}C$$
$$J^{06} = Q^{04}Q^{05}\bar{Q}^{06}Q^{07}\bar{Q}^{08}C$$
$$K^{06} = (Q^{04}Q^{05}Q^{06}+Q^{08})Q^{07}C$$
$$P_1 = \bar{Q}^{04}\bar{Q}^{05}\bar{Q}^{06}$$
$$P_2 = Q^{04}\bar{Q}^{05}\bar{Q}^{06}$$
$$P_3 = \bar{Q}^{04}Q^{05}\bar{Q}^{06}$$
$$P_4 = Q^{04}Q^{05}\bar{Q}^{06}$$
$$P_5 = \bar{Q}^{04}\bar{Q}^{05}Q^{06}$$
$$P_6 = Q^{04}\bar{Q}^{05}Q^{06}$$
$$P_7 = \bar{Q}^{04}Q^{05}Q^{06}$$
$$P_8 = Q^{04}Q^{05}Q^{06}$$

Signal $Q^{07}$ is obtained from the program counter control flip flop FF07 (FIGURE 5a), and signals $Q^{08}$ and $\bar{Q}^{08}$ are obtained from the program counter phase change flip flop FF08 (FIGURE 5a). As long as $Q^{07}\bar{Q}^{08}$ exists, successive clock pulses C will step the program counter successively through its eight configurations $P_1, P_2 ... P_8$; however, if $\bar{Q}^{07}$ exists the program counter is locked in a given configuration. Signal $Q^{08}$ interrupts the normal sequence of steps of the program counter and resets it to configuration $P_2$. The functions of the eight configurations of the program counter are given in Table IX:

TABLE IX

| Configuration | P-loop Solution | N-loop Correction |
|---|---|---|
| $P_1$ | Readout Accumulator to "P" Setpoint Register. | Readout Accumulator to "N" Setpoint Register. |
| $P_2$ | Transfer K into Accumulator. | Clear Accumulator. |
| $P_3$ | Count Desorbent Flow into Accumulator. | Copy N setpoint into Accumulator. |
| $P_4$ | Count flush flow into accumulator. | Not used. |
| $P_5$ | Count sorbate flow into accumulator. | Not used. |
| $P_6$ | Not used | Not used. |
| $P_7$ | Count feed flow into accumulator. | Not used. |
| $P_8$ | Not used | Count N-loop error into accumulator. |

During a P-loop solution all of the operations listed thereunder in Table IX are not necessarily carried out; the actual operations are fixed by the state of the phase storage flip flops FF01–FF03 which in turn determines when program counter control flip flop FF07 will be set down to $\overline{Q}^{07}$ so that the program counter will be locked in a given one or more of configurations $P_3$, $P_4$, $P_5$ or $P_7$. The logic equations for FF07 are given by:

$$J^{07} = (f^{19}\overline{Q}^{07} + S^1 P_2 \overline{Q}^{07})C$$
$$K^{07} = [Q^{07}\overline{Q}^{34}(f^{23}P_3 + f^{25}P_4 + f^{26}P_3 + f^{26}P_4 + f^{27}P_2 + f^{27}P_3 + f^{27}P_4 + f^{28}P_4 + f^{28}P_6 + P_8 + \overline{S}^1 P_1) + Q^{05}Q^{06}Q^{07}Q^{34}]C$$

Signal $f^{19}$ is a reset signal obtained from time gate F19 (FIGURE 5c) and appears upon completion of a given operation in a P-loop solution, or upon completion of an N-loop correction, or upon arrival of the program counter at configuration $P_1$; signal $f^{19}$ sets FF07 to $Q^{07}$ which in turn allows the program counter to proceed to the next configuration. $S^1$ is the P-loop ON-OFF switch. Signals $Q^{34}$ and $\overline{Q}^{34}$ are obtained from "N" loop correction control flip flop FF34 (FIGURE 5a); $Q^{34}$ signifies that an N-loop correction is being made and prevents FF07 from being set down to $\overline{Q}^{07}$ until after the program counter has arrived at configuration $P_7$; the absence of $\overline{Q}^{34}$ isolates FF07 from the influence of the phase storage circuit and suspends the P-loop solutions until the N-loop correction is completed. The $K^{07}$ logic determines which set of equations will be followed during a P-loop solution; that given above provides Zone II flow control.

As hereinafter explained, the K value—set-point of Zone II flow—is transferred into the accumulator by a single clock pulse when $P_2\overline{Q}^{34}$ exists; therefore, regardless of the state of phase storage flip flops FF01–03 and regardless of the $K^{07}$ logic, K is always transferred into the accumulator—except during an N-loop correction—on the same clock pulse which shifts the configuration of the program counter from $P_2$ to $P_3$. However, the variable flow signals from the desorbent, flush, sorbate and feed streams are counted into the accumulator so that the program counter must be locked in configuration $P_3$ a sufficient time to permit the desorbent flow to be counted in, or in $P_4$ to permit the flush flow to be counted in, or in $P_5$ to permit the sorbate flow to be counted in, or in $P_7$ to permit the feed flow to be counted in. If the program counter is permitted to step successively from $P_1$ to $P_8$ upon corresponding successive clock pulses, then none of the variable flow signals will be counted into the accumulator and it will contain only K when configuration $P_1$ is reached.

This is precisely the case when $f^{24}$ exists. Since $f^{24}$ does not appear in the $K^{07}$ logic, FF07 remains in state $Q^{07}$ from $P_1$ through $P_8$; the next clock pulse which sets $P_8$ to $P_1$ will also set FF07 down to $\overline{Q}^{07}$ but then $f^{19}$ exists so that the next clock pulse thereafter will set FF07 up to $Q^{07}$. Successive clock pulses thereafter will step the program counter from $P_1$ to $P_2$ to $P_3$, etc. Therefore, when $f^{24}$ exists, the count stored in the accumulator when the program counter reaches configuration $P_1$ is equal to K, which conforms to Table VIII, supra.

As hereinafter explained, means are provided for counting up or down into the accumulator in accordance with the algebraic sign of a given flow signal specified by the particular setpoint equation involved. For Zone II control, only the desorbent flow D is assigned a minus sign so that the accumulator will count down when the desorbent flow pulses are being gated into the accumulator; the flush, sorbate and feed flows are assigned plus signs so that the accumulator will count up when these flow pulses are being gated into the accumulator.

When $f^{25}$ exists, FF07 will be set down to $\overline{Q}^{07}$ on the same clock pulse which steps the program counter from $P_4$ to $P_5$ by reason of the term $f^{25}P_4$ in the $K^{07}$ logic; the program counter will then be locked in configuration $P_5$ until such time as the sorbate flow is counted into the accumulator, the completion of which is signified by $f^{19}$; $f^{19}$ plus a clock pulse resets FF07 to $Q^{07}$, permitting the program counter to be stepped through its remaining configurations $P_6$, $P_7$ . . . $P_4$. Therefore, when $f^{25}$ exists, the total count stored in the accumulator when the program counter reaches configuration $P_1$ is equal to $K+n$.

If $f^{26}$ exists, FF07 will be set down to $\overline{Q}^{07}$ on the same clock pulse which steps the program counter to configuration $P_4$ by reason of the term $f^{26}P_3$ in the $K^{07}$ logic; the program counter will then be locked in $P_4$ until such time as the flush flow is counted into the accumulator; $f^{19}$ plus a clock pulse then resets FF07 to $Q^{07}$. The next clock pulse steps the program counter to $P_5$ and sets FF07 down to $\overline{Q}^{07}$ by reason of the term $f^{26}P_4$ in the $K^{07}$ logic; the program counter will then be locked in $P_5$ until such time as the sorbate flow is counted into the accumulator; $f^{19}$ plus a clock pulse then resets FF07 to $Q^{07}$, permitting the program counter to be stepped through its remaining configurations $P_6$ $P_7$ . . . $P_3$ upon receiving successive clock pulses. Therefore, when $f^{26}$ exists, the total count stored in the accumulator when the program counter reaches $P_1$ is equal to $K+n+f$.

If $f^{27}$ exists, FF07 will be set down to $\overline{Q}^{07}$ on the same clock pulse which steps the program counter from configuration $P_2$ to $P_3$ by reason of the term $f^{27}P_2$ in the $K^{07}$ logic; the program counter will then be locked in $P_3$ until such time as the desorbent flow is counted (down) into the accumulator; $f^{19}$ plus a clock pulse then resets FF07 to $Q^{07}$. The next clock pulse steps the program counter to $P_4$ and sets FF07 down to $\overline{Q}^{07}$ by reason of the term $f^{27}P_3$ in the $K^{07}$ logic; the program counter will then be locked in $P_4$ until such time as the flush flow is counted into the accumulator; $f^{19}$ plus a clock pulse then resets FF07 to $Q^{07}$. The next clock pulse steps the program counter to $P_5$ and sets FF07 down to $\overline{Q}^{07}$ by reason of the term $f^{27}P_4$ in the $K^{07}$ logic; the program counter will then be locked in $P_5$ until such time as the sorbate flow is counted into the accumuator; $f^{19}$ plus a clock pulse then resets FF07 to $Q^{07}$, permitting the program counter to be stepped through its remaining configurations $P_6$, $P_7$ . . . $P_2$ upon receiving successive clock pulses. Therefore, when $f^{27}$ exists, the total count stored in the accumulator when the program counter reaches $P_1$ is equal to $K+n+f-D$.

If $f^{28}$ exists, FF07 will be set down to $\overline{Q}^{07}$ on the same clock pulse which steps the program counter from configuration $P_3$ to $P_4$ by reason of the term $f^{28}P_3$ in the $K^{07}$ logic; the program counter will then be locked in $P_4$ until such time as the flush flow is counted into the accumulator; $f^{19}$ plus a clock pulse then resets FF07 to $Q^{07}$, permitting the program counter to be stepped through configurations $P_5$ and $P_6$ upon receiving the next two clock pulses. The third clock pulse steps the program counter from $P_6$ to $P_7$ ond sets FF07 to $\overline{Q}^{07}$ by reason of the term $f^{28}P_6$ in the $K^{07}$ logic; the program counter will then be locked in $P_7$ until such time as the feed flow is counted into the accumulator; $f^{19}$ plus a clock pulse then resets FF07 to $Q^{07}$, permitting the program counter to be stepped through its remaining configurations $P_8, P_1 \ldots P_3$ upon receiving successive clock pulses. Therefore, when $f^{28}$ exists, the total count stored in the accumulator when the program counter reaches $P^1$ is equal to $K+f+F$.

If $f^{23}$ exists, FF07 will be set down to $\overline{Q}^{07}$ on the same same clock pulse which sets the program counter to configuration $P_4$ by virtue of the term $f^{23}P_3$ in the $K^{07}$ logic; the program counter will then be locked in configuration $P_4$ until such time as the flush flow is counted into the accumulator $f^{19}$ plus a clock pulse resets FF07 to $Q^{07}$, permitting the program counter to be stepped through its remaining configurations $P_5, P_6 \ldots P_3$ upon receiving successive clock pulses. Therefore, when $f^{23}$ exists, the total count stored in the accumulator when the program counter reaches $P_1$ is equal to $K+f$.

The term $Q^{05}Q^{06}Q^{07}Q^{34}$ in the $K^{07}$ logic program counter control flip flop FF07 renders it operative during an N-loop correction. On the next clock pulse after the program counter reaches configuration $P_7$ ($Q^{05}Q^{06}$ exists), FF07 is set down to $\overline{Q}^{07}$ and the program counter is stepped to $P_8$ where it is held until the N-loop correction is completed at which time $f^{19}$ sets FF07 up to $Q^{07}$, permitting the program counter to be stepped through $P_1, P_2$, etc. by succeeding clock pulses.

The program counter phase change flip-flop FF08 (FIGURE 5a) is operative upon a phase change, i.e., change of setpoint equation, during the P-loop solutions and also signifies the beginning of an N-loop correction. It is responsive to any of momentary contact closures $W^{01}, W^{02} \ldots W^{06}$ of P-loop stepping switch 155 and also to momentary contact closure $W^{08}$ of N-loop trigger switch 157 appearing on line 156. The logic equation for FF08 are given by:

$$J^{08} = (W^{01}+W^{02}+W^{03}+W^{04}+W^{05}+W^{06}+S^2+W^{08}\overline{Q}^{41})\overline{Q}^{34}C$$

$$K^{08} = Q^{07}Q^{08}C$$

The term $S^2$ represents a pushbutton for manually resetting the program counter to facilitate initial calibration of the P-loop system. Signal $\overline{Q}^{41}$ is obtained from N-loop interlock flip flop FF41 (FIGURE 5a) and exists during P-loop solutions. If the computer is presently in a P-loop solution, $\overline{Q}^{41}\overline{Q}^{34}$ exists and any of switch closures $W^{01} \ldots W^{06}, W^{08}$ will set FF08 up to $Q^{08}$. If at that time $Q^{07}$ exists, or until such time as FF07 should be set from $\overline{Q}^{07}$ to $Q^{07}$, the next clock pulse thereafter will reset the program counter to configuration $P_2$ regardless of its previous configuration—by virtue of the term $Q^{07}Q^{08}$ appearing in the $J^{04}, K^{05}$ and $K^{06}$ logic, supra—and will also set FF08 down to $\overline{Q}^{08}$. With the program counter in $P_2$, the computer is ready to commence a new P-loop solution or N-loop correction as the case may be.

The N-loop correction control flip flop FF34 and the N-loop interlock flip flop FF41 (FIGURE 5a) are operative only during an N-loop correction. The logic equations for FF34 and FF41 are given by:

$$J^{34} = W^{08}Q^{08}\overline{Q}^{41}C$$
$$K^{34} = Q^{41}P_1C$$
$$J^{41} = f^{30}C$$
$$K^{41} = \overline{W}^{08}\overline{Q}^{34}C$$

Signal $f^{30}$ is obtained from clearing gate F30 (FIGURE 5b):

$$f^{30} = Q^{34}P_2$$

It is also employed to clear the accumulator. Signal $\overline{W}^{08}$ is obtained from an inverter gate. When contact closure $W^{08}$ is made during a P-loop solution ($\overline{Q}^{34}\overline{Q}^{41}$ exists), the next clock pulse sets FF08 to $Q^{08}$; the second clock pulse thereafter sets FF34 to $Q^{34}$, the program counter to $P_2$, and FF08 to $\overline{Q}^{08}$; the third clock pulse sets FF41 to $Q^{41}$ and the program counter to $P_3$. As long as $Q^{34}$ exists, FF07 will remain in $Q^{07}$ until the program counter reaches $P_7$; the eighth clock pulse sets the program counter to $P_8$ and FF07 to $\overline{Q}^{07}$, locking the program counter in $P_8$ until the N-loop error has been counted into the accumulator, at which time $f^{19}$ appears at the $J^{07}$ terminal. The next clock pulse sets FF07 to $Q^{07}$ and the second clock pulse thereafter sets the program counter to $P_1$; the third clock pulse sets FF34 to $\overline{Q}^{34}$, and the program counter to $P_2$, whence the P-loop solutions are again commenced; the fourth clock pulse following the appearance of $f^{19}$ sets FF41 to $\overline{Q}^{41}$ and the program counter to $P_3$.

The computer employs two clock generators: the C clock or 60-cycle clock, and the $C_p$ clock or flowmeter clock. These are shown in FIGURE 5c. The C clock comprises a pulse shaping network connected to a 6.3 volt source of alternating current and delivers constant frequency pulses C to the various flip flops as indicated in the signal flow diagram. The $C_p$ clock comprises logical input gates and a pulse shaping network. The excitation for the $C_p$ clock is derived alternately from the pulse inputs from the four turbine flowmeters and from the C clock: $W^F$ represents pulses from feed flowmeter 147 delivered by line 146; $W^D$ represents pulses from desorbent flowmeter 149 delivered by line 148; $W^n$ represents pulses from sorbate flowmeter 151 delivered by line 150; and $W^f$ represents pulses from flush flowmeter 153 delivered by line 152. The output of the $C_p$ clock consists of pulses $C_p$ which are delivered to the accumulator (FIGURE 5c), to accumulator count control flip flop FF10 (FIGURE 5b) to accumulator sign storage flip flop FF11 (FIGURE 5c), and to the N-loop correction counter FF35–39 (FIGURE 5d). The logic equation for the $C_p$ clock is given by:

$$C_p = f^{37}C + f^{36}W^D + P_4W^f + f^{38}W^n + P_7W^F$$

Signal $f^{37}$ gates 60-cycles A.-C. to the $C_p$ clock either when K is being transferred into the accumulator during a P-loop solution, or during an N-loop correction. It is obtained from 60-cycle gate F37 (FIGURE 5b) the logic of which is given by:

$$f^{37} = P_2 + Q^{34}$$

Signal $f^{36}$ gates $W^D$ to the $C_p$ clock during a P-loop solution. It is obtained from "D" gate F36 (FIGURE 5b) the logic of which is given by:

$$f^{36} = P_3\overline{Q}^{34}$$

Signal $f^{38}$ gates $W^n$ to the $C_p$ clock during a P-loop solution. It is obtained from "n" gate F38 (FIGURE 5b) the logic of which is given by:

$$f^{38} = P_5$$

Signals $P_4$ and $P_7$ gate $W^f$ and $W^F$, respectively, to the $C_p$ clock during a P-loop solution. These are obtained from the program counter, previously described.

The time gate counter (FIGURE 5b), comprising nine flip flops FF24–FF32, controls the gating time of each of the four flowmeter inputs, that is, the length of time during which each of the pulse signals $W^F, W^D, W^n$ and $W^f$ is counted into the accumulator via the $C_p$ clock. The action of the time gate counter is initiated by time gate counter control flip flop FF33 (FIGURE 5b). The logic equations for FF33 are given by:

$$J^{33} = \overline{Q}^{07}\overline{Q}^{33}(\overline{Q}^{04}+Q^{05}+Q^{06})C$$
$$K^{33} = f^{19}Q^{33}C$$

The term $(\overline{Q}^{04}+Q^{05}+Q^{06})$ will be recognized as $\overline{P}_2$. The reason for this restriction is that when the computer is turned off, the program counter halts in $P_2$ and FF07 rests in $\overline{Q}^{07}$ which is the only time that $P_2\overline{Q}^{07}$ exists. When the computer is turned back on, the time gate counter is therefore prevented from starting a false count. Therefore, whenever program counter control flip flop FF07 is set down to $\overline{Q}^{07}$ and provided the program counter is not in configuration $P_2$, the next clock pulse will set FF33 up to $Q^{33}$, and succeeding clock pulses will step the time gate counter through its various configurations. The logic equations for the time gate counter are given by:

$$J^{24}=(Q^{33}\overline{Q}^{24})C$$
$$K^{24}=(\overline{Q}^{33}+Q^{33}Q^{24})C$$
$$J^{25}=(Q^{33}Q^{24}\overline{Q}^{25})C$$
$$K^{25}=(\overline{Q}^{33}+Q^{33}Q^{24}Q^{25})C$$
$$J^{26}=Q^{33}Q^{24}Q^{25}\overline{Q}^{26}C$$
$$K^{26}=(\overline{Q}^{33}+f^{20})C$$
$$J^{27}=f^{20}\overline{Q}^{27}C$$
$$K^{27}=(\overline{Q}^{33}+f^{20}Q^{27})C$$
$$J^{28}=(f^{20}Q^{27}\overline{Q}^{28})C$$
$$K^{28}=(\overline{Q}^{33}+f^{20}Q^{27}Q^{28})C$$
$$J^{29}=(f^{20}Q^{27}Q^{28}\overline{Q}^{29})C$$
$$K^{29}=(\overline{Q}^{33}+f^{21})C$$
$$J^{30}=f^{21}\overline{Q}^{30}C$$
$$K^{30}=(\overline{Q}^{33}+f^{21}Q^{30})C$$
$$J^{31}=f^{21}Q^{30}\overline{Q}^{31}C$$
$$K^{31}=(\overline{Q}^{33}+f^{21}Q^{30}Q^{31})C$$
$$J^{32}=f^{21}Q^{30}Q^{31}\overline{Q}^{32}C$$
$$K^{32}=(\overline{Q}^{33}+f^{21}Q^{30}Q^{31}Q^{32})C$$

Signals $f^{20}$ and $f^{21}$ are obtained from logical followers F20 and F21 used in the reduction of the time gate counter logic:

$$f^{20}=Q^{33}Q^{24}Q^{25}Q^{26}$$
$$f^{21}=Q^{33}Q^{24}Q^{25}Q^{26}Q^{27}Q^{28}Q^{29}$$

Switches $S^D$, $S^f$, $S^n$ and $S^F$ (FIGURE 5b) set the time gate duration to be used for sampling the desorbent, flush, sorbate and feed flows respectively. Each of these switches is a group of three three-deck rotary switches having one pole and eight positions per deck. The $Q^{24}$–$Q^{32}$ terminals and the $\overline{Q}^{24}$–$\overline{Q}^{32}$ terminals of the time gate counter are appropriately connected to the resulting nine decks of each of switches $S^D$, $S^f$, $S^n$ and $S^F$. Taking switch $S^D$ as exemplary of all switches, the first deck of the first switch thereof is wired such that its pole, designated as $S^{D1}$, is connected to $\overline{Q}^{24}$ in the first, third, fifth and seventh positions, and to $Q^{24}$ in the second, fourth, sixth, and eighth positions; the second deck of the first switch thereof is wired such that its pole, designated as $S^{D2}$, is connected to $\overline{Q}^{25}$ in the first, second, fifth and sixth positions, and to $Q^{25}$ in the third, fourth, seventh and eighth positions; the third deck of the first switch thereof is wired such that its pole, designated as $S^{D3}$, is connected to $\overline{Q}^{26}$ in the first four positions and to $Q^{26}$ in the last four positions. Thus, the first of the three switches making up $S^D$ has eight positions corresponding with the eight possible configurations of flip flops FF24, FF25 and FF26 of the time gate counter. Similarly, the second and third of the three switches making up $S^D$ read out flip flops FF27–29 and FF30–32, respectively. This gives a total of nine poles $S^{D1}$, $S^{D2}$ . . . $S^{D9}$ representing a 9-bit binary number the value of which is determined by one of $2^9$ possible switch configurations. For a given switch configuration, all poles $S^{D1}$, $S^{D2}$ . . . $S^{D9}$ will be energized when the time gate counter reaches a count corresponding thereto. If the nine poles are connected to an appropriate AND gate, the output of the gate then signifies the arrival of the time counter at a count equivalent to the setting of switch $S^D$.

Each of the four groups of poles—$S^{D1}$ . . . $S^{D9}$ of switch $S^D$, $S^{f1}$ . . . $S^{f9}$ of switch $S^f$, $S^{n1}$ . . . $S^{n9}$ of switch $S^n$, and $S^{F1}$–$S^{F9}$ of switch $S^F$—is therefore connected to an AND gate comprising the input logic of time gate F19 (FIGURE 5c):

$$f^{19}=P_3 S^{D1}S^{D2} \ldots S^{D9}+P_4 S^{f1}S^{f2} \ldots S^{f9}$$
$$+P_5 S^{n1}S^{n2} \ldots S^{n9}+P_7 S^{F1}S^{F2} \ldots S^{F9}$$
$$+P_1+Q^{10}\overline{Q}^{40}P_8+\overline{Q}^{10}Q^{40}P_8$$

The last two terms of this equation—$Q^{10}\overline{Q}^{40}P_8+\overline{Q}^{10}Q^{40}P_8$—signify completing the step of counting the N-loop error into the accumulator during an N-loop correction, as will be more fully explained hereinbelow. Assume that the computer is in a P-loop solution and is presently counting the desorbent flow into the accumulator; the program counter is in configuration $P_3$ and will remain there until the second clock pulse C after the appearance of signal $f^{19}$, which in turn will be delayed for $x$ number of clock pulses C, following the clock pulse which sets FF33 to $Q^{33}$, as determined by the setting of switch $S^D$; since signal $f^{19}$ is in the $J^{07}$ logic of program counter control flip flop FF07 and also in the $K^{33}$ logic of time gate counter control flip flop FF33, the first clock pulse following the appearance of $f^{19}$ set FF07 to $Q^{07}$ and FF33 to $\overline{Q}^{33}$, and the second clock pulse steps the program counter to configuration $P_4$ and also resets the time gate counter to $\overline{Q}^{24}\overline{Q}^{25}$ . . . $\overline{Q}^{32}$ by reason of signal $\overline{Q}^{33}$ in the $K^{24}$, $K^{25}$ . . . $K^{32}$ logic. The operation of the time gate counter and time gate F19 is analogous when the flush, sorbate, and feed flows are being counted into the accumulator. The relative settings of switches $S^D$, $S^f$, $S^n$, and $S^F$ therefore provide different gating times for the respective flow signals, thereby compensating for different flowmeter calibration factors. It will be seen that $f^{19}$ also exists when $P_1$ exists; the same clock pulse which steps the program counter from configuration $P_8$ to $P_1$ during a P-loop solution also sets FF07 down to $\overline{Q}^{07}$ by reason of the term $P_8$ in the $K^{07}$ logic; this would lock the program counter in $P_1$ were it not for the fact that $f^{19}$ is in the $J^{07}$ logic so that the second clock pulse thereafter sets FF07 to $Q^{07}$ and the third clock pulse steps the program counter to $P_2$.

Accumulator count control flip flop FF10 (FIGURE 5c) allows the accumulator to count, either up or down, during a P-loop solution, and also provides signals utilized by time gate F19 during an N-loop correction. It is actuated by clock pulses $C_p$ from the $C_p$ clock. The logic equations for FF10 are given by:

$$J^{10}=(Q^{24}Q^{33}\overline{Q}^{34}+Q^{40}Q^{34}P_7)C_p$$
$$K^{10}=(\overline{Q}^{33}\overline{Q}^{34}+\overline{Q}^{40}Q^{34}P_7)C_p$$

As above noted, in a P-loop solution ($\overline{Q}^{34}$ exists), the beginning of a flowmeter count is signified by program counter control flip flop FF07 being set down to $\overline{Q}^{07}$; the first clock pulse C thereafter sets time gate counter control flip flop FF33 up to $Q^{33}$; the second clock pulse C sets FF24 of the time gate counter up to $Q^{24}$; $Q^{24}Q^{33}\overline{Q}^{34}$ now exists so that the next flowmeter clock pulse $C_p$ sets FF10 up to $Q^{10}$, permitting the accumulator to count starting with the second flowmeter clock pulse $C_p$. The completion of a flowmeter count is signified by the appearance of $f^{19}$; the next clock pulse C then sets FF07 up to $Q^{07}$ and FF33 down to $\overline{Q}^{33}$ so that the next flowmeter clock pulse $C_p$ sets FF10 down to $\overline{Q}^{10}$, preventing the accumulator from responding to further pulses $C_p$. The output $Q^{10}$ of FF10 is taken through two logical followers: accumulator up gate F10 and accumulator down gate F11 (FIGURE 5c). Gate F10 directs the accumulator to count up and its logic is given by:

$$f^{10}=Q^{10}P_4+Q^{10}P_5+Q^{10}P_7+f^{31}$$

Gate F11 directs the accumulator to count down and its logic is given by:

$$f^{11}=Q^{10}P_3+f^{32}$$

These equations are valid for Zone II flow control and would be appropriately changed, along with the $K^{07}$ logic, if it were desired to program the P-loop computer for Zone I, III or IV flow control. Signal $f^{11}$ exists when the program counter is locked in configuration $P_3$, i.e., desorbent flow is being counted into the accumulator, so that the sign of desorbent flow D is negative as required by the Zone II setpoint equation. Signal $f^{10}$ exists when the program counter is locked in configurations $P_4$ (count in flush flow $f$), $P_5$ (count in sorbate flow $n$), and $P_7$ (count in feed flow F) so that the signs of these flows are positive as required by the Zone II setpoint equation. Signals $f^{31}$ and $f^{32}$ are operative only during an N-loop correction as will be explained later.

The accumulator (FIGURE 5c) comprises twelve flip flops FF12–FF23, driven by flowmeter clock $C_p$, and suitable input logic. The logic equations therefor are given by:

$$J^{12} = (f^{29}S^{K1} + f^{35}R^{N1} + f^{10}\overline{Q}^{12} + f^{11}\overline{Q}^{12})C_p$$
$$K^{12} = (f^{29}\overline{S}^{K1} + f^{30} + f^{10}Q^{12} + f^{11}Q^{12})C_p$$
$$J^{13} = (f^{29}S^{K2} + f^{35}R^{N2} + f^{10}Q^{12}\overline{Q}^{13} + f^{11}\overline{Q}^{12}\overline{Q}^{13})C_p$$
$$K^{13} = (f^{29}\overline{S}^{K2} + f^{30} + f^{10}Q^{12}\overline{Q}^{13} + f^{11}\overline{Q}^{12}Q^{13})C_p$$
$$J^{14} = (f^{29}S^{K3} + f^{35}R^{N3} + f^{10}Q^{12}Q^{13}\overline{Q}^{14} + f^{13})C_p$$
$$K^{14} = (f^{29}\overline{S}^{K3} + f^{30} + f^{12} + f^{11}\overline{Q}^{12}\overline{Q}^{13}Q^{14})C_p$$
$$J^{15} = (f^{29}S^{K4} + f^{35}R^{N4} + f^{12}\overline{Q}^{15} + f^{13}\overline{Q}^{15})C_p$$
$$K^{15} = (f^{29}\overline{S}^{K4} + f^{30} + f^{12}Q^{15} + f^{13}Q^{15})C_p$$
$$J^{16} = (f^{29}S^{K5} + f^{35}R^{N5} + f^{12}Q^{15}\overline{Q}^{16} + f^{13}\overline{Q}^{15}\overline{Q}^{16})C_p$$
$$K^{16} = (f^{29}\overline{S}^{K5} + f^{30} + f^{12}Q^{15}Q^{16} + f^{13}\overline{Q}^{15}Q^{16})C_p$$
$$J^{17} = (f^{29}S^{K6} + f^{35}R^{N6} + f^{12}Q^{15}Q^{16}\overline{Q}^{17} + f^{15})C_p$$
$$K^{17} = (f^{29}\overline{S}^{K6} + f^{30} + f^{14} + f^{13}\overline{Q}^{15}\overline{Q}^{16}Q^{17})C_p$$
$$J^{18} = (f^{29}S^{K7} + f^{35}R^{N7} + f^{14}\overline{Q}^{18} + f^{15}\overline{Q}^{18})C_p$$
$$K^{18} = (f^{29}\overline{S}^{K7} + f^{30} + f^{14}Q^{18} + f^{15}Q^{18})C_p$$
$$J^{19} = (f^{29}S^{K8} + f^{35}R^{N8} + f^{14}Q^{18}\overline{Q}^{19} + f^{15}\overline{Q}^{18}\overline{Q}^{19})C_p$$
$$K^{19} = (f^{29}\overline{S}^{K8} + f^{30} + f^{14}Q^{18}Q^{19} + f^{15}\overline{Q}^{18}Q^{19})C_p$$
$$J^{20} = (f^{29}S^{K9} + f^{35}R^{N9} + f^{14}Q^{18}Q^{19}\overline{Q}^{20} + f^{17})C_p$$
$$K^{20} = (f^{29}\overline{S}^{K9} + f^{30} + f^{16} + f^{15}\overline{Q}^{18}\overline{Q}^{19}Q^{20})C_p$$
$$J^{21} = (f^{29}S^{K10} + f^{16}\overline{Q}^{21} + f^{17}\overline{Q}^{21})C_p$$
$$K^{21} = (f^{29}\overline{S}^{K10} + f^{30} + f^{16}Q^{21} + f^{17}Q^{21})C_p$$
$$J^{22} = (f^{29}S^{K11} + f^{16}Q^{21}\overline{Q}^{22} + f^{17}\overline{Q}^{21}\overline{Q}^{22})C_p$$
$$K^{22} = (f^{29}\overline{S}^{K11} + f^{30} + f^{16}Q^{21}Q^{22} + f^{17}\overline{Q}^{21}Q^{22})C_p$$
$$J^{23} = (f^{29}S^{K12} + f^{16}Q^{21}Q^{22}\overline{Q}^{23} + f^{17}\overline{Q}^{21}\overline{Q}^{22}\overline{Q}^{23})C_p$$
$$K^{23} = (f^{29}\overline{S}^{K12} + f^{30} + f^{16}Q^{21}Q^{22}Q^{23} + f^{17}\overline{Q}^{21}\overline{Q}^{22}Q^{23})C_p$$

Signals $f^{12}$, $f^{13}$ ... $f^{17}$ are obtained from six logical followers F12, F13 ... F17 used in the reduction of accumulator logic:

$$f^{12} = f^{10}Q^{12}Q^{13}Q^{14}$$
$$f^{13} = f^{11}\overline{Q}^{12}\overline{Q}^{13}\overline{Q}^{14}$$
$$f^{14} = f^{10}Q^{12}Q^{13}Q^{14}Q^{15}Q^{16}Q^{17}$$
$$f^{15} = f^{11}\overline{Q}^{12}\overline{Q}^{13}\overline{Q}^{14}\overline{Q}^{15}\overline{Q}^{16}\overline{Q}^{17}$$
$$f^{16} = f^{10}Q^{12}Q^{13}Q^{14}Q^{15}Q^{16}Q^{17}Q^{18}Q^{19}Q^{20}$$
$$f^{17} = f^{11}\overline{Q}^{12}\overline{Q}^{13}\overline{Q}^{14}\overline{Q}^{15}\overline{Q}^{16}\overline{Q}^{17}\overline{Q}^{18}\overline{Q}^{19}\overline{Q}^{20}$$

The terms $f^{29}S^{K1}$, $f^{29}S^{K2}$ ... $f^{29}S^{K12}$ appearing in the $J^{12}$, $J^{13}$ ... $J^{23}$ equations, respectively, and the terms $f^{29}\overline{S}^{K1}$, $f^{29}\overline{S}^{K2}$ ... $f^{29}\overline{S}^{K12}$ appearing in the $K^{12}$, $K^{13}$ ... $K^{23}$ equations, respectively, provide for the introduction of K—the setpoint of the Zone II flow—into the accumulator during a P-loop solution. "K" input switch 200 (FIGURE 5c) comprises a group of four three-deck rotary switches having one pole and eight positions per deck. The $J^{12}$–$J^{23}$ terminals and the $K^{12}$–$K^{23}$ terminates of the accumulator are connected respectively to the outputs of twenty-four dual input AND gates. The first deck of the first switch comprising "K" input switch 200 is wired such that its pole is connected to one input of the $K^{12}$ AND gate in the first, third, fifth and seventh switch positions ($\overline{S}^{K1}$) and to one input of the $J^{12}$ AND gate in the second, fourth, sixth and eighth switch positions ($S^{K1}$); the second deck of the first switch thereof is wired such that its pole is connected to one input of the $K^{13}$ AND gate in the first, second, fifth and sixth switch positions ($\overline{S}^{K2}$) and to one input of the $J^{13}$ AND gate in the third, fourth, seventh and eighth switch positions; ($S^{K2}$); the third deck of the first switch thereof is wired such that its pole is connected to one input of the $K^{14}$ AND gate in the first four switch positions ($\overline{S}^{K3}$) and to one input of the $J^{14}$ AND gate in the last four switch positions ($S^{K3}$). A voltage is supplied to each of the three poles of this first switch. Thus, the first of the four rotary switches comprising switch 200 has eight positions corresponding with the eight possible configurations of flip flops FF12, FF13 and FF14 of the accumulator. Signal $f^{29}$ is applied to the other input of each of said AND gates, being obtained from "K" gate F29 (FIGURE 5b) whose equation is given by:

$$f^{29} = \overline{Q}^{34}P_2$$

Similarly, the second, third and fourth of the four rotary switches making up "K" input switch 200 read into flip flops FF15–17, FF18–20 and FF21–23, respectively, through corresponding AND gates also receiving $f^{29}$. For a given switch configuration, either $S^{K1}$ or $\overline{S}^{K1}$, $S^{K2}$ or $\overline{S}^{K2}$ ... $S^{K12}$ or $\overline{S}^{K12}$ will be energized corresponding to a particular one of a twelve-bit binary number. When $f^{29}$ exists, the next clock pulse $C_p$ will copy the K value into the accumulator, also clearing it of the count previously stored therein. At this time, $C_p$ is derived from 60-cycle line frequency rather than from the flowmeter inputs by reason of signal $f^{37}$ which gates 60 cycles to the $C_p$ clock generator, discussed supra.

Signal $f^{30}$, appearing in the $K^{12}$, $K^{13}$ ... $K^{23}$ equations, clears the accumulator and is operative only during an N-loop correction. It is obtained from clearing gate F30 (FIGURE 5b):

$$f^{30} = Q^{34}P_2$$

Signal $f^{30}$ also allows N-loop interlock flip flop FF41 to be set up to $Q^{41}$ on the next clock pulse C.

The terms $f^{35}R^{N1}$, $f^{35}R^{N2}$ ... $f^{35}R^{N9}$, appearing in the $J^{12}$, $J^{13}$ ... $J^{20}$ equations, respectively, provide for the transfer of the previously computed N-loop setpoint (setpoint of sorbate flow controller 167 in FIGURE 1) from the "N" setpoint register (FIGURE 5d) to the accumulator and are operative only during an N-loop correction. Signal $f^{35}$ is obtained from N-loop gate F35 (FIGURE 5b):

$$f^{35} = Q^{34}P_3$$

Signals $R^{N1}$, $R^{N2}$ ... $R^{N9}$ are present or absent depending upon the state of nine bistable switching elements comprising the "N" setpoint register.

Accumulator sign storage flip flop FF11 (FIGURE 5c) determines whether the accumulator will be read out and prevents the transfer of a negative number from the accumulator to the "N" or "P" setpoint registers. It is actuated by flowmeter clock pulses $C_p$. The logic equations for FF11 are given by:

$$J^{11} = f^{11}\overline{Q}^{11}\overline{Q}^{12}\overline{Q}^{13}\overline{Q}^{14}\overline{Q}^{15}\overline{Q}^{16}\overline{Q}^{17}\overline{Q}^{18}\overline{Q}^{19}\overline{Q}^{20}\overline{Q}^{21}\overline{Q}^{22}\overline{Q}^{23}C_p$$
$$K^{11} = (f^{10}Q^{11}Q^{12}Q^{13}Q^{14}Q^{15}Q^{16}Q^{17}$$
$$Q^{18}Q^{19}Q^{20}Q^{21}Q^{22}Q^{23} + P_2)C_p$$

$Q^{11}$ exists when the net count in the accumulator is negative, i.e., when the accumulator has counted down to $\overline{Q}^{12}\overline{Q}^{13}$ ... $\overline{Q}^{23}$ and is instructed to continue to count down. This might occur during a P-loop solution or during an N-loop correction if a large upset has occurred. The accumulator count is transferred either to the "P" setpoint register or to the "N" setpoint register when the program counter is in the $P_1$ configuration, provided however that $\overline{Q}^{11}$ exists, by means of accumulator readout gate F22 (FIGURE 5c):

$$f^{22} = \overline{Q}^{11}P_1$$

$\overline{Q}^{11}$ exists whenever the net count in the accumulator is positive or when it is filled to capacity and is instructed to continue to count up. FF11 is also set to $\overline{Q}^{11}$ by the same clock pulse which transfers K into the accumulator and steps the program counter from $P_2$ to $P_3$, and it normally remains in $\overline{Q}^{11}$ barring a process upset.

Readout from the accumulator to the "N" or "P" setpoint registers is controlled by "N" setpoint gate G01 and "P" setpoint gate G02, respectively (FIGURE 5a):

$$g^{01} = Q^{34}Q^{41}$$
$$g^{02} = \overline{Q}^{34} + \overline{Q}^{41}$$

The "N" setpoint register and the "P" setpoint register (FIGURE 5d) each comprise nine magnetically latching mercury relays having a set position R and a reset position $\bar{R}$. The logic equations for the "N" setpoint register are given by:

$$R^{N1}=f^{22}Q^{12}g^{01}$$
$$\bar{R}^{N1}=f^{22}\bar{Q}^{12}g^{01}$$
$$. \quad . \quad . \quad .$$
$$R^{N9}=f^{22}Q^{20}g^{01}$$
$$\bar{R}^{N9}=f^{22}\bar{Q}^{20}g^{01}$$

The logic equations for the "P" setpoint register are given by:

$$R^{P1}=f^{22}Q^{12}g^{02}$$
$$\bar{R}^{P1}=f^{22}\bar{Q}^{12}g^{02}$$
$$. \quad . \quad . \quad .$$
$$R^{P9}=f^{22}Q^{20}g^{02}$$
$$\bar{R}^{P9}=f^{22}\bar{Q}^{20}g^{02}$$

The relays have contacts which in the set position thereof are connected in shunt with corresponding resistors forming a parallel ladder network which in turn is connected to a source of regulated voltage. The values of the resistors are chosen so that the current flow through the network is numerically equivalent to the digital number stored by the register, thus effecting a digital-to-analog conversion of the register count. The current level should be compatible with the process controllers receiving these setpoint signals, which in this particular case is in the range of 1–5 milliamperes D.C. The analog output of the "N" setpoint register is delivered via line 166 to sorbate flow controller 167, and the analog output of the "P" setpoint register is delivered via line 162 to pumparound flow controller 163. The relays of the "N" setpoint register have additional contacts for feeding $R^{N1}$, $R^{N2}$ ... $R^{N9}$ back to the accumulator in response to the $f^{35}$ signal obtained during an N-loop correction. An N-loop setpoint input switch 201 (FIGURE 5d) is provided for initially transferred the desired sorbate flow controller setpoint into the "N" setpoint register to facilitate system startup. Switch 201 comprises three three-deck rotary switches each having one pole and eight positions per deck. It is wired in the same manner as "K" input switch 200, and is normally disconnected from the "N" setpoint register. It will be observed that the setpoint registers each have a 9-bit capacity whereas the accumulator has a 12-bit capacity, leaving an excess of 3 bits in the accumulator. This feature makes it possible to shift the significant numbers in the accumulator output in order to provide flexibility in calibrating the system in accordance with process requirements. Thus, the "N" setpoint register may be wired to read out $Q^{14}$–$Q^{22}$ and $\bar{Q}^{14}$–$\bar{Q}^{22}$, if desired, so that a zero count in the register corresponds with a finite number in the accumulator.

It has previously been shown how the occurrence of a momentary contact closure $W^{08}$ on line 156 interrupts the present series of P-loop solutions and initiates an N-loop correction. Successive clock pulses C thereafter step the program counter successively from configuration $P_2$ to $P_8$, during which interval $f^{30}$ clears the accumulator and $f^{35}$ copies the N-loop setpoint into the accumulator. The program counter is then locked in $P_8$ to permit the N-loop error to be counted into the accumulator.

In FIGURE 5d, error comparator 202 comprises a clock-driven magnetic error detector such as the "Magsense" analog-to-digital converter manufactured by Daystrom, Inc. It continuously receives a 1–5 milliampere D.C. error signal from composition controller 160 via line 159 and a feedback signal from the N-loop correction counter, which is an up-down counter comprising five flip flops FF35–39 stepped by clock pulses $C_p$. Terminals $Q^{35}$, $Q^{36}$ ... $Q^{39}$ of the correction counter, when activated, energize corresponding digital gates which short circuit resistors connected in a current-carrying ladder network to produce a variable feedback current of 1–5 milliamperes D.C. equivalent to the count stored in the correction counter. The digital gates and resistor matrix form part of the error comparator circuitry. The output of composition controller 160 is adjusted by means of manual reset such that 3 milliamperes in line 159 represents "zero" error. Signal $f^{35}$, in addition to copying the N-loop setpoint into the accumulator, sets the N-loop correction counter to $\bar{Q}^{35}\bar{Q}^{36}\bar{Q}^{37}\bar{Q}^{38}Q^{39}$ which is one-half of its capacity and which produces a 3 milliampere feedback signal for error comparator 202. If the error signal on line 159 is greater than the feedback signal, clock pulses C appear on the $J_p^{40}$ terminal of the error comparator and up-down control flip flop FF40 is set up to $Q^{40}$ signifying that the N-loop correction counter is to count up; if the error signal on line 159 is less than the feedback signal, clock pulses C appear on the $K_p^{40}$ terminal of the error comparator and FF40 is set down to $\bar{Q}^{40}$ signifying that the N-loop correction counter is to count down. If the count stored in the correction counter is substantially equal to the error signal, the output of the error comparator will then hunt or oscillate between terminals $J_p^{40}$ and $K_p^{40}$ upon successive clock pulses.

When the program counter is stepped from $P_7$ to $P_8$ during an N-loop correction, accumulator count control flip flop FF10 (FIGURE 5b) is set up $Q^{10}$ if the N-loop correction counter is about to count up ($Q^{40}$ exists) or to $\bar{Q}^{10}$ if the correction counter is about to count down ($\bar{Q}^{40}$ exists). The FF10 logic is repeated here for convenience:

$$J^{10}=(Q^{24}Q^{33}\bar{Q}^{34}+Q^{40}Q^{34}P_7)C_p$$
$$K^{10}=(\bar{Q}^{33}\bar{Q}^{34}+\bar{Q}^{40}Q^{34}P_7)C_p$$

Here FF10 is not used to allow the accumulator to count but rather furnishes signals $Q^{10}$ or $\bar{Q}^{10}$ to gate F19 in preparation for an $f^{19}$ reset signal signifying completion of the step of counting the N-loop error into the correction counter and into the accumulator.

This step is initiated by signal $P_8$ which activates correction counter up gate F31 (FIGURE 5d) if $Q^{40}$ exists or correction counter down gate F32 (FIGURE 5d) if $\bar{Q}^{40}$ exists, in accordance with the following logic equations:

$$f^{31}=Q^{34}P_8Q^{40}(\bar{Q}^{35}+\bar{Q}^{36}+\bar{Q}^{37}+\bar{Q}^{38}+\bar{Q}^{39})$$
$$f^{32}=Q^{34}P_8\bar{Q}^{40}(Q^{35}+Q^{36}+Q^{37}+Q^{38}+Q^{39})$$

Signal $f^{31}$ directs the N-loop correction counter to count up and signal $f^{32}$ directs the correction counter to count down, beginning with the next clock pulse $C_p$. Note that the up count is terminated if the correction counter should become filled to capacity, and the down count is terminated if the stored count should reach zero. Such saturation of counter capacity might result in the event of a large process upset but is ordinarily prevented by sufficiently reducing the gain (increasing the proportional band) of controller 160. The logic equations for the N-loop correction counter are given by:

$$J^{35}=(f^{31}\bar{Q}^{35}+f^{32}\bar{Q}^{35})C_p$$
$$K^{35}=(f^{31}Q^{35}+f^{32}Q^{35}+f^{35})C_p$$
$$J^{36}=(f^{31}Q^{35}\bar{Q}^{36}+f^{32}\bar{Q}^{35}\bar{Q}^{36})C_p$$
$$K^{36}=(f^{31}Q^{35}Q^{36}+f^{32}\bar{Q}^{35}\bar{Q}^{36}+f^{35})C_p$$
$$J^{37}=(f^{31}Q^{35}Q^{36}\bar{Q}^{37}+f^{34})C_p$$
$$K^{37}=(f^{33}+f^{32}\bar{Q}^{35}\bar{Q}^{36}Q^{37}+f^{35})C_p$$
$$J^{38}=(f^{33}\bar{Q}^{38}+f^{34}\bar{Q}^{38})C_p$$
$$K^{38}=(f^{33}Q^{38}+f^{34}Q^{38}+f^{35})C_p$$
$$J^{39}=(f^{33}Q^{38}\bar{Q}^{39}+f^{34}\bar{Q}^{38}\bar{Q}^{39}+f^{35})C_p$$
$$K^{39}=(f^{33}Q^{38}Q^{39}+f^{34}\bar{Q}^{38}Q^{39})C_p$$

Signals $f^{33}$ and $f^{34}$ are obtained from logical followers F33 and F34 used in the reduction of N-loop correction counter logic:

$$f^{33}=Q^{35}Q^{36}Q^{37}f^{31}$$
$$f^{34}=\bar{Q}^{35}\bar{Q}^{36}\bar{Q}^{37}f^{32}$$

Signal $f^{31}$ also activates accumulator up gate F10 (FIGURE 5c), directing the accumulator to count up beginning with the next clock pulse $C_p$; and signal $f^{32}$ also activates accumulator down gate F11 (FIGURE 5c), directing the accumulator to count down beginning with the next clock pulse $C_p$.

The accumulator and the N-loop correction counter will then both count in step and in the same direction until such time as the count arrived at in the correction counter substantially equals the error signal delivered by line 159 to error comparator 202. This point is signified by the appearance of a "down" pulse on the $K_p^{40}$ terminal if the correction counter has previously been counting up, or by the appearance of an "up" pulse on the $J_p^{40}$ terminal if the correction counter has previously been counting down. In the former event, up-down control flip flop FF40 will shift from $Q^{40}$ to $\overline{Q}^{40}$ and in the latter event FF40 will shift from $\overline{Q}^{40}$ to $Q^{40}$. This information is utilized by gate F19 to generate an $f^{19}$ reset signal. It will be recalled that the last two terms of the $f^{19}$ logic are given by:

$$f^{19} = \ldots Q^{10}\overline{Q}^{40}P_8 + \overline{Q}^{10}Q^{40}P_8$$

Therefore, $f^{19}$ will appear either if the count has been up ($Q^{10}$ exists) and a "down" pulse subsequently appears, or if the count has been down ($\overline{Q}^{10}$ exists) and an "up" pulse subsequently appears. The next clock pulse following the appearance of $f^{19}$ sets program counter control flip flop FF07 up to $Q^{07}$ and the second clock pulse thereafter steps the program counter to $P_1$ whereby the newly computed N-loop setpoint is transferred from the accumulator to the "N" setpoint register. The third clock pulse steps the program counter to $P_2$ and the P-loop solutions are resumed.

An increase in dielectric constant sensed by probe 161 in the midzone of Zone II is corrected by decreasing the rate of sorbate product withdrawal; and conversely, a decrease in dielectric constant is corrected by increasing the rate of sorbate product withdrawal. The proper overall control action is therefore provided by making controller 160 reverse-acting, that is, an actual positive error produces a decreased error signal on line 159 and an actual negtaive error produces an increased error signal.

In the foregoing discussion the P-loop computer program for Zone II flow control has been considered. A change to any other program is easily accomplished by changing the $K^{07}$ logic of the program counter and the logic of accumulator up gate F10 and accumulator down gate F11. For example, the program for Zone IV flow control (see Table III, supra) is defined by:

$$K^{07} = [Q^{07}\overline{Q}^{34}(f^{23}P_2 + f^{23}P_4 + f^{24}P_2 + f^{24}P_3 + f^{24}P_4 + f^{25}P_2 + f^{25}P_3 + f^{26}P_2 + f^{28}P_2 + f^{28}P_4 + f^{28}P_6 + P_8 + \overline{s}^1P_1) + Q^{05}Q^{06}Q^{07}Q^{34}]C$$

$$f^{10} = Q^{10} + P_3 + Q^{10}P_7 + f^{31}$$
$$f^{11} = Q^{10}P_4 + Q^{10}P_5 + f^{32}$$

For Zone IV flow control, provided by the above logic equations, the significance of the six configurations of the phase storage flip flops is given by Table X:

TABLE X

| Pumparound flow controller 163 secs Flow of Zone | Contact Closure of Switch 155 | Configuration of Phase Storage Circuit | Magnitude of P |
|---|---|---|---|
| IIa | W01 | f23 | K+D−n. |
| II | W02 | f24 | K+D−f−n. |
| III | W03 | f25 | K+D−f. |
| IIIa | W04 | f26 | K+D. |
| IV | W05 | f27 | K. |
| I | W06 | f28 | K+D−n+F. |

Programs for the flow control of other zones are as easily set up but will not be dealt with here as they will be obvious to those skilled in the computer art in the light of the foregoing teaching.

The preferred modes of controlling the separation process are (1) program the P-loop computer for Zone IV flow control and allow the N-loop computer to adjust the sorbate product withdrawal rate in response to a dielectric constant measurement taken in Zone II, or (2) program the P-loop computer for Zone II flow control and allow the N-loop computer to adjust the raffinate product withdrawal rate in response to a dielectric constant measurement taken in Zone IV, in which case the sorbate product stream would be taken off on back pressure control and would be the "unsensed" process stream. In either case, the K value is manually set by the plant operator. However, a further refinement of this invention provides that the K value need not in fact be "constant" but may be automatically adjusted in response to some other process variable, for example, a dielectric constant measurement taken in Zone I. This may be accomplished by modifying the P-loop computer to the extent of replacing "K" input switch 200 with a relay or flip flop register functionally equivalent to the "N" setpoint register, triggering the N-loop computer in the midzone of Zone I, and transferring the computed result from the accumulator to the "K" register instead of to the "N" setpoint register. The N-loop computer would also perform its usual N-loop correction at the midzone of Zone II or IV, reading out the computed result to the "N" setpoint register at this latter time.

IV. *Other applications of the simulated moving bed process*

The simulated moving bed process is applicable to many types of fluid separations utilizing inclusion complexes, whether carried out in the liquid, gas or vapor phase. With reference to selective sorption by means of molecular sieves, the process can be used to isolate not only branched-chain aliphatic hydrocarbons but also cyclic hydrocarbons containing four or more carbon atoms, such as benzene, toluene, xylene, etc., polycyclic aromatics, cycloparaffins, and the like. The simulated moving bed process may also be employed in the purification of water by ion-exchange resins. In addition to zeolites, other inclusion complexes may constitute the fixed bed contacting zone, such as hydroquinone for the purification of argon, nickel cyanide-ammonia for the separation of benzene, urea and thiourea adducts for the sorption of straight chain aliphatic hydrocarbons, desoxycholic acid for the sorption of aromatics and fatty acids, etc.

The basic flow pattern of the process may further be employed to effect reaction-regeneration processes wherein the solid contacting material is a catalyst which must be periodically regenerated as, for example, in fixed bed catalytic cracking to produce gasoline from gas oils or hydrogen from light paraffins. In such case, the solid contacting material may be a silica-alumina or nickel-alumina composite and the pumparound fluid a gas comprising carbon oxides and/or steam. Assuming a counterclockwise rotation of the process streams, they would comprise, proceeding counterclockwise around the closed flow path: feed in, reactants out, air in, flue gas out, and stripping steam in. In accordance with the present invention, the setpoint computer may then be programmed to hold constant the pumparound flow within a selected portion of the contacting zone, for example, the reaction zone between the feed inlet and reactant outlet points. Since such process involves both molecular and temperature changes, the volumetric flows would not be additive so that the stream flow rate information would require conversion to a mass flow basis for utilization by the computer, as by incorporating specific gravity compensation into the flow measurements. The computer may also vary the rate of regeneration air in response to temperature of the regeneration zone, or in response to oxygen concentration at a selected sampling point therein as provided by an oxygen analyzer.

I claim as my invention:

1. In a continuous fluid-solid contacting process for altering the composition of a feed stream to yield a product stream wherein a pumparound fluid is continuously circulated through an elongated contacting zone containing a solid contacting material which effects said alteration of composition, one end of said contatcing zone communicating with the other through a flow-regulating means to form a closed flow path therethrough and said contacting zone having a plurality of intermittently flow-conducting transfer points spaced along the length of said flow path, and wherein $r$ fluid process streams including said feed and product streams are substantially simultaneously introduced to and withdrawn from said contacting zone through a set of corresponding inlet and outlet points selected from said transfer points, and wherein said process streams are periodically shifted in unison successively from one set of transfer points to the next in a downstream direction with respect to the flow of said pumparound fluid whereby each of said process streams eventually passes through each of said transfer points, the method of controlling the flow rate of said pumaround fluid existing within that portion of said contacting zone which lies between a selected pair of adjacent process streams, irrespective of their instantaneous physical position relative to said flow-regulating means, which method comprises: separately sensing the flow rates of at least $r-1$ process streams and producing a group of flow sensations corresponding thereto; automatically producing from said group of flow sensations a setpoint signal in accordance with the number, direction and flow rates of the process streams passing through those transfer points between said flow-regulating means and the one of said pair of adjacent process streams which is more remote from said flow-regulating means; and adjusting said flow-regulating means in response to said setpoint signal.

2. In a continuous fluid-solid contacting process for altering the composition of a feed stream to yield a product stream wherein a pumparound fluid is continuously circulated through an elongated contacting zone containing a solid contacting material which effects said alteration of composition, one end of said contacting zone communicating with the other through a flow-regulating means to form a closed flow path therethrough and said contacting zone having a plurality of intermittently flow-conducting transfer points spaced along the length of said flow path, and wherein $r$ fluid process streams including said feed and product streams are substantially simultaneously introduced to and withdrawn from said contacting zone through a set of corresponding inlet and outlet points selected from said transfer points, and wherein a flush stream is charged to said contacting zone through a transfer point which is upstream from the feed inlet point, said flush stream and said process streams hereinafter being collectively designated as "secondary" streams, and wherein said secondary streams are periodically shifted in unison successively from one set of transfer points to the next in a downstream direction with respect to the flow of said pumparound fluid whereby each of said secondary streams eventually passes through each of said transfer points, the method of controlling the flow rate of said pumparound fluid existing within that portion of said contacting zone which lies between a selected pair of adjacent secondary streams, irrespective of their instantaneous physical position relative to said flow-regulating means, which method comprises: separately sensing the flow rates of at least $r$ secondary streams and producing a group of flow sensations corresponding thereto; automatically producing from said group of flow sensations a setpoint signal in accordance with the number, direction and flow rates of the process streams passing through those transfer points between said flow-regulating means and the one of said pair of adjacent process streams which is more remote from said flow-regulating means; and adjusting said flow-regulating means in response to said setpoint signal.

3. In a continuous process for separating the components of a mixture of fluid compounds, at least one of which is selectively sorbed by contact with a solid sorbent and at least one other component is relatively less sorbent by the sorbent which is capable of having its sorbency restored by displacing selectively sorbed component therefrom, wherein a pumparound fluid is continuously circulated through an elongated contacting zone containing said solid sorbent, one end of said contacting zone communicating with the other through a flow-regulating means to form a closed flow path therethrough and said contacting zone having a plurality of intermittently flow-conducting transfer points spaced along the length of said flow path, and wherein there are substantially simultaneously introduced to and withdrawn from said contacting zone in alternating relationship $r$ fluid process streams including, in the following order and proceeding in a downstream direction with respect to the flow of said pumparound fluid (a) a feed stream containing said mixture of fluid compounds, (b) a first product stream containing relatively less sorbed component, (c) a desorbent stream capable of displacing the selectively sorbed component from said sorbent, and (d) a second product stream containing a mixture of selectively sorbed component and desorbent, said process streams being passed through a set of corresponding inlet and outlet points selected from said transfer points, and wherein said process streams are periodically shifted in unison successively from one set of transfer points to the next in a downstream direction with respect to the flow of said pumparound fluid whereby each of said process streams eventually passes through each of said transfer points, the method of controlling the flow rate of said pumparound fluid exising within that portion of said contacting zone which lies between a selected pair of adjacent process streams, irrespective of their instantaneous physical position relative to said flow-regulating means, which method comprises: separately sensing the flow rates of $r-1$ process streams and producing a group of flow sensations corresponding thereto, the flow rate of the remaining process stream being unsensed; producing a setpoint signal P whose magnitude is defined by $$P=K+A$$

where K is the desired magnitude of the pumparound flow herein controlled and A is automatically computed from said group of flow sensations such that (1) whenever said unsensed process stream passes through a transfer point between either of said pair of process streams and said flow-regulating means, proceeding downstream along said flow path, then $$A=S_L^1-S_E^1$$

where $S_L^1$=sum of the flow rates of all process streams leaving said flow path between the downstream one of said pair of process streams and said flow-regulating means, proceeding upstream along said flow path, and $S_E^1$=sum of the flow rates of all process streams entering said flow path between the downstream one of said pair of process streams and said flow-regulating means, proceeding upstream along said flow path, and (2) whenever said unsensed process stream passes through a transfer point between either of said pair of process streams and said flow-regulating means, proceeding upstream along said flow path, then $$A=S_E^2-S_L^2$$

where $S_E^2$=sum of the flow rates of all process streams entering said flow path between the upstream one of said pair of process streams and said flow-regulating means, proceeding downstream along said flow path, and $S_L^2$=sum of the flow rates of all process streams leaving said flow path between the upstream one of said pair of process streams and said flow-regulating means, proceeding downstream along said flow path; and adjusting said flow-regulating means in response to said setpoint signal.

4. The method of claim 3 further characterized in that said sorbent is a dehydrated metal aluminosilicate hydrate containing pores which permit the sorption of a straight chain compound containing at least four carbon atoms and which rejects compounds containing at least four carbon atoms having a branched chain or cyclic structure.

5. The method of claim 4 further characterized in that said mixture of fluid compounds comprises a normal aliphatic hydrocarbon containing at least four carbon atoms as the selectively sorbed component and a hydrocarbon selected from the group consisting of branched chain and cyclic hydrocarbons containing at least four carbon atoms as the other component relatively less sorbed by the sorbent.

6. The method of claim 3 further characterized in that said remaining unsensed process stream is one of said first and second product streams.

7. In a continuous process for separating the components of a mixture of fluid compounds, at least one of which is selectively sorbed by contact with a solid sorbent and at least one other component is relatively less sorbed by the sorbent which is capable of having its sorbency restored by displacing selectively sorbed component therefrom, wherein a pumparound fluid is continuously circulated through an elongated contacting zone containing said solid sorbent, one end of said contacting zone communicating with the other through a flow-regulating means to form a closed flow path therethrough and said contacting zone having a plurality of intermittently flow-conducting transfer points spaced along the length of said flow path, and wherein there are substantially simultaneously introduced to and withdrawn from said contacting zone in alternating relationship four fluid process streams consisting, in the following order and proceeding in a downstream direction with respect to the flow of said pumparound fluid, of (a) a feed stream containing said mixture of fluid compounds, (b) a first product stream containing relatively less sorbed component, (c) a desorbent stream capable of displacing the selectively sorbed component from said sorbent, and (d) a second product stream containing a mixture of selectively sorbed component and desorbent, said process streams being passed through a set of corresponding inlet and outlet points selected from said transfer points, and wherein said process streams are periodically shifted in unison successively from one set of transfer points to the next in a downstream direction with respect to the flow of said pumparound fluid whereby each of said process streams eventually passes through each of said transfer points, the method of controlling the flow rate of said pumparound fluid existing within that portion of said contacting zone which lies between a selected pair of adjacent process streams, irrespective of their instantaneous physical position relative to said flow-regulating means, which method comprises: separately sensing the flow rates of said feed, desorbent, and second product streams and producing a group of flow sensations corresponding thereto; producing a setpoint signal P whose magnitude is defined by $$P=K+A$$

where K is the desired magnitude of the pumparound flow herein controlled and A is automatically computed from said group of flow sensations such that (1) whenever said first product stream passes through a transfer point between either of said pair of process streams and said flow-regulating means, proceeding downstream along said flow path, then $$A=S_L^1-S_E^1$$

where $S_L^1$=sum of the flow rates of all process streams leaving said flow path between the downstream one of said pair of process streams and said flow-regulating means, proceeding upstream along said flow path, and $S_E^1$=sum of the flow rates of all process streams entering said flow path between the downstream one of said pair of process streams and said flow-regulating means, proceeding upstream along said flow path, and (2) whenever said first product stream passes through a transfer point between either of said pair of process streams and said flow-regulating means, proceeding upstream along said flow path, then $$A=S_E^2-S_L^2$$

where $S_E^2$=sum of the flow rates of all process streams entering said flow path between the upstream one of said pair of process streams and said flow-regulating means, proceeding downstream along said flow path, and $S_L^2$=sum of the flow rates of all process streams leaving said flow path between the upstream one of said pair of process streams and said flow-regulating means, proceeding downstream along said flow path; and adjusting said flow-regulating means in response to said setpoint signal.

8. In a continuous process for separating the components of a mixture of fluid compounds, at least one of which is selectively sorbed by contact with a solid sorbent and at least one other component is relatively less sorbed by the sorbent which is capable of having its sorbency restored by displacing selectively sorbed component therefrom, wherein a pumparound fluid is continuously circulated through an elongated contacting zone containing said solid sorbent, one end of said contacting zone communicating with the other through a flow-regulating means to form a closed flow path therethrough and said contacting zone having a plurality of intermittently flow-conducting transfer points spaced along the length of said flow path, and wherein there are substantially simultaneously introduced to and withdrawn from said contacting zone in alternating relationship four fluid process streams consisting, in the following order and proceeding in a downstream direction with respect to the flow of said pumparound fluid, of (a) a feed stream containing said mixture of fluid compounds and having a flow rate F, (b) a first product stream containing relatively less sorbed component, (c) a desorbent stream capable of displacing the selectively sorbed component from said sorbent and having a flow rate D, and (d) a second product stream containing a mixture of selectively sorbed component and desorbent and having a flow rate n, said process streams being passed through a set of corresponding inlet and outlet points selected from said transfer points, and wherein said process streams are periodically shifted in unison successively from one set of transfer points to the next in a downstream direction with respect to the flow of said pumparound fluid whereby each of said process streams eventually passes through each of said transfer points, the method of controlling the flow rate of said pumparound fluid existing within that portion of said contacting zone which lies between said feed and second product streams, irrespective of their instantaneous physical position relative to said flow-regulating means, which method comprises: separately sensing said flow rates F, D and n and producing a group of flow sensations corresponding thereto; producing a setpoint signal P whose magnitude is defined by $$P=K+A$$

where K is the desired magnitude of the pumparound flow herein controlled and A is automatically computed from said group of flow sensations such that (1) after traversal of said flow-regulating means by said feed stream and before traversal thereof by said second product stream, then $$A=0$$

and (2) after traversal of said flow-regulating means by said second product stream and before traversal thereof by said desorbent stream, then $$A = n$$

and (3) after traversal of said flow-regulating means by said desorbent stream and before traversal thereof by said first product stream, then $$A = n - D$$

and (4) after traversal of said flow-regulating means by said first product stream and before traversal thereof by said feed stream, then $$A = F$$

and adjusting said flow-regulating means in response to said setpoint signal.

9. In a continuous process for separating the components of a mixture of fluid compounds, at least one of which is selectively sorbed by contact with a solid sorbent and at least one other component is relatively less sorbed by the sorbent which is capable of having its sorbency restored by displacing selectively sorbed component therefrom, wherein a pumparound fluid is continuously circulated through an elongated contacting zone containing said solid sorbent, one end of said contacting zone communicating with the other through a flow-regulating means to form a closed flow path therethrough and said contacting zone having a plurality of intermittently flow-conducting transfer points spaced along the length of said flow path, and wherein there are substantially simultaneously introduced to and withdrawn from said contacting zone in alternating relationship four fluid process streams consisting, in the following order and proceeding in a downstream direction with respect to the flow of said pumparound fluid, of (a) a feed stream containing said mixture of fluid compounds and having a flow rate F, (b) a first product stream containing relatively less sorbed component, (c) a desorbent stream capable of displacing the selectively sorbed component from said sorbent and having a flow rate D, and (d) a second product stream containing a mixture of selectively sorbed component and desorbent and having a flow rate $n$, said process streams being passed through a set of corresponding inlet and outlet points selected from said transfer points, and wherein said process streams are periodically shifted in unison successively from one set of transfer points to the next in a downstream direction with respect to the flow of said pumparound fluid whereby each of said process streams eventually passes through each of said transfer points, the method of controlling the flow rate of said pumparound fluid existing within that portion of said contacting zone which lies between said desorbent and first product streams, irrespective of their instantaneous physical position relative to said flow-regulating means, which method comprises: separately sensing said flow rates F, D and $n$ and producing a group of flow sensations corresponding thereto; producing a setpoint signal P whose magnitude is defined by $$P = K + A$$

where K is the desired magnitude of the pumparound flow herein controlled and A is automatically computed from said group of flow sensations such that (1) after traversal of said flow-regulating means by said desorbent stream and before traversal thereof by said first product stream, then $$A = 0$$

and (2) after traversal of said flow-regulating means by said first product stream and before traversal thereof by said feed stream, then $$A = D - n + F$$

and (3) after traversal of said flow-regulating means by said feed stream and before traversal thereof by said second product stream, then $$A = D - n$$

and (4) after traversal of said flow-regulating means by said second product stream and before traversal thereof by said desorbent stream, then $$A = D$$

and adjusting said flow-regulating means in response to said setpoint signal.

10. In a continuous process for separating the components of a mixture of fluid compounds, at least one of which is selectively sorbed by contact with a solid sorbent and at least one other component is relatively less sorbed by the sorbent which is capable of having its sorbency restored by displacing selectively sorbed component therefrom, wherein a pumparound fluid is continuously circulated through an elongated contacting zone containing said solid sorbent, one end of said contacting zone communicating with the other through a flow-regulating means to form a closed flow path therethrough and said contacting zone having a plurality of intermittently flow-conducting transfer points spaced along the length of said flow path, and wherein there are substantially simultaneously introduced to and withdrawn from said contacting zone in alternating relationship $r$ fluid process streams including, in the following order and proceeding in a downstream direction with respect to the flow of said pumparound fluid (a) a feed stream containing said mixture of fluid compounds, (b) a first product stream containing relatively less sorbed component, (c) a desorbent stream capable of displacing the selectively sorbed component from said sorbent, and (d) a second product stream containing a mixture of selectively sorbed component and desorbent, said process streams being passed through a set of corresponding inlet and outlet points selected from said transfer points, and wherein a flush stream is charged to said contacting zone through a transfer point which is upstream from the feed inlet point, said flush stream and said process streams hereinafter being collectively designated as "secondary" streams, and wherein said secondary streams are periodically shifted in unison successively from one set of transfer points to the next in a downstream direction with respect to the flow of said pumparound fluid whereby each of said secondary streams eventually passes through each of said transfer points, the method of controlling the flow rate of said pumparound fluid existing within that portion of said contacting zone which lies between a selected pair of adjacent secondary streams, irrespective of their instantaneous physical positive relative to said flow-regulating means, which method comprises: separately sensing the flow rates of $r$ secondary streams and producing a group of flow sensations corresponding thereto, the flow rate of the remaining secondary stream being unsensed; producing a setpoint signal P whose magnitude is defined by $$P = K + A$$

where K is the desired magnitude of the pumparound flow herein controlled and A is automatically computed from said group of flow sensations such that (1) whenever said unsensed secondary stream passes through a transfer point between either of said pair of secondary streams and said flow-regulating means, proceeding downstream along said flow path, then $$A = S_L^1 - S_E^1$$

where $S_L^1$ = sum of the flow rates of all secondary streams leaving said flow path between the downstream one of said pair of secondary streams and said flow-regulating means, proceeding upstream along said flow path, and $S_E^1$ = sum of the flow rates of all secondary streams entering said flow path between the downstream one of said pair of secondary streams and said flow-regulating means, proceeding upstream along said flow path, and (2) whenever said unsensed secondary stream passes through a transfer point between either of said pair of secondary streams and said flow-regulating means, proceeding upstream along said flow path, then $$A = S_E^2 - S_L^2$$

where $S_E^2 =$ sum of the flow rates of all secondary streams entering said flow path between the upstream one of said pair of secondary streams and said flow-regulating means, proceeding downstream along said flow path, and $S_L^2 =$ sum of the flow rates of all secondary streams leaving said flow path between the upstream one of said pair of secondary streams and said flow-regulating means, proceeding downstream along said flow path; and adjusting said flow-regulating means in response to said setpoint signal.

11. The method of claim 10 further characterized in that said sorbent is a dehydrated metal aluminosilicate hydrate containing pores which permit the sorption of a straight chain compound containing at least four carbon atoms and which rejects compounds containing at least four carbon atoms having a branched chain or cyclic structure.

12. The method of claim 11 further characterized in that said mixture of fluid compounds comprises a normal aliphatic hydrocarbon containing at least four carbon atoms as the selectively sorbed component and a hydrocarbon selected from the group consisting of branched chain and cyclic hydrocarbons containing at least four carbon atoms as the other component relatively less sorbed by the sorbent.

13. In a continuous process for separating the components of a mixture of fluid compounds, at least one of which is selectively sorbed by contact with a solid sorbent and at least one other component is relatively less sorbed by the sorbent which is capable of having its sorbency restored by displacing selectively sorbed component therefrom, wherein a pumparound fluid is continuously circulated through an elongated contacting zone containing said solid sorbent, one end of said contacting zone communicating with the other through a flow-regulating means to form a closed flow path therethrough and said contacting zone having a plurality of intermittently flow-conducting transfer points spaced along the length of said flow path, and wherein there are substantially simultaneously introduced to and withdrawn from said contacting zone in alternating relationship four fluid process streams consisting, in the following order and proceeding in a downstream direction with respect to the flow of said pumparound fluid, of (a) a feed stream containing said mixture of fluid compounds and having a flow rate F, (b) a first product stream containing relatively less sorbed component, (c) a desorbent stream capable of displacing the selectively sorbed component from said sorbent and having a flow rate D, and (d) a second product stream containing a mixture of selectively sorbed component and desorbent and having a flow rate $n$, said process streams being passed through a set of corresponding inlet and outlet points selected from said transfer points, and wherein a flush stream having a flow rate $f$ is withdrawn from said contacting zone through a transfer point which is downstream from the desorbent stream inlet point and upstream from the second product stream outlet point and said withdrawn flush stream is then charged to said contacting zone through a transfer point which is downstream from said second product stream outlet point and upstream from the feed stream inlet point, and wherein said process and flush streams are periodically shifted in unison successively from one set of transfer points to the next in a downstream direction with respect to the flow of said pumparound fluid whereby each of said process and flush streams eventually passes through each of said transfer points, the method of controlling the flow rate of said pumparound fluid existing within that portion of said contacting zone which lies between said charged flush and second product streams, irrespective of their instantaneous physical position relative to said flow-regulating means, which method comprises: separately sensing said flow rates F, D, $n$ and $f$ and producing a group of flow sensations corresponding thereto; producing a setpoint signal P whose magnitude is defined by $$P = K + A$$

where K is the desired magnitude of the pumparound flow herein controlled and A is automatically computed from said group of flow sensations such that (1) after traversal of said flow-regulating means by said charged flush stream and before traversal thereof by said second product stream then $$A = 0$$

and (2) after traversal of said flow-regulating means by said second product stream and before traversal thereof by said withdrawn flush stream then $$A = n$$

and (3) after traversal of said flow-regulating means by said withdrawn flush stream and before traversal thereof by said desorbent stream then $$A = n + f$$

and (4) after traversal of said flow-regulating means by said desorbent stream and before traversal thereof by said first product stream then $$A = n + f - D$$

and (5) after traversal of said flow-regulating means by said first product stream and before traversal thereof by said feed stream then $$A = f + F$$

and (6) after traversal of said flow-regulating means by said feed stream and before traversal thereof by said charged flush stream then $$A = f$$

and adjusting said flow-regulating means in response to said setpoint signal.

14. In a continuous process for separating the components of a mixture of fluid compounds, at least one of which is selectively sorbed by contact with a solid sorbent and at least one other component is relatively less sorbed by the sorbent which is capable of having its sorbency restored by displacing selectively sorbed component therefrom, wherein a pumparound fluid is continuously circulated through an elongated contacting zone containing said solid sorbent, one end of said contacting zone communicating with the other through a flow-regulating means to form a closed flow path therethrough and said contacting zone having a plurality of intermittently flow-conducting transfer points spaced along the length of said flow path, and wherein there are substantially simultaneously introduced to and withdrawn from said contacting zone in alternating relationship four fluid process streams consisting, in the following order and proceeding in a downstream direction with respect to the flow of said pumparound fluid, of (a) a feed stream containing said mixture of fluid compounds and having a flow rate F, (b) a first product stream containing relatively less sorbed component, (c) a desorbent stream capable of displacing the selectively sorbed component from said sorbent and having a flow rate D, and (d) a second product stream containing a mixture of selectively sorbed component and desorbent and having a flow rate $n$, said process streams being passed through a set of corresponding inlet and outlet points selected from said transfer points, and wherein a flush stream having a flow rate $f$ is withdrawn from said contacting zone through a transfer point which is downstream from the desorbent stream inlet point and upstream from the second product stream outlet point and said withdrawn flush stream is then charged to said contacting zone through a transfer point which is downstream from said second product stream outlet point and upstream from the feed stream inlet point, and wherein said process and flush streams are periodically shifted in unison successively from one set of transfer points to the next in a downstream direction with respect to the flow of said pumparound fluid whereby each of said process and flush streams eventually passes through each of said transfer points, the method of controlling the flow rate of said pumparound fluid existing within that portion of said contacting zone which lies between said desorbent and first product streams, irrespective of their instantaneous physical position relative to said flow-regulating means, which method comprises: separately sensing said flow rates F, D, $n$ and $f$ and producing a group of flow sensations corresponding thereto; producing a setpoint signal P whose magnitude is defined by $$P = K + A$$

where K is the desired magnitude of the pumparound flow herein controlled and A is automatically computed from said group of flow sensations such that (1) after traversal of said flow-regulating means by said desorbent stream and before traversal thereof by said first product stream then $$A = 0$$

and (2) after traversal of said flow-regulating means by said first product stream and before traversal thereof by said feed stream then $$A = D - n + F$$

and (3) after traversal of said flow-regulating means by said feed stream and before traversal thereof by said charged flush stream then $$A = D - n$$

and (4) after traversal of said flow-regulating means by said charged flush stream and before traversal thereof by said second product stream then $$A = D - n - f$$

and (5) after traversal of said flow-regulating means by said second product stream and before traversal thereof by said withdrawn flush stream then $$A = D - f$$

and (6) after traversal of said flow-regulating means by said withdrawn flush stream and before traversal thereof by said desorbent stream then $$A = D$$

and adjusting said flow-regulating means in response to said setpoint signal.

15. In a continuous fluid-solid contacting process for altering the composition of a feed stream to yield a product stream wherein a pumparound fluid is continuously circulated through an elongated contacting zone containing a solid contacting material which effects said alteration of composition, one end of said contacting zone communicating with the other through a flow-varying means to form a closed flow path therethrough and said contacting zone having a plurality of intermittently flow-conducting transfer points spaced along the length of said flow path, and wherein $r$ fluid process streams including said feed and product streams are substantially simultaneously introduced to and withdrawn from said contacting zone through a set of corresponding inlet and outlet points selected from said transfer points, and wherein said process streams are periodically shifted in unison successively from one set of transfer points to the next in a downstream direction with respect to the flow of said pumparound fluid whereby each of said process streams eventually passes through each of said transfer points, the method of controlling the flow rate of said pumparound fluid existing within that portion of said contacting zone which lies between a selected pair of adjacent process streams, irrespective of their instantaneous physical position relative to said flow-varying means, which method comprises: sensing the flow rate of said pumparound fluid existing at a fixed flow-measuring point in said flow path and producing a first flow sensation corresponding thereto; separately sensing the flow rates of $r-1$ process streams and producing a group of flow sensations corresponding thereto, the flow rate of the remaining process stream being unsensed; producing a setpoint signal P whose magnitude is defined by $$P = K + A$$

where K is the desired magnitude of the pumparound flow herein controlled and A is automatically computed from said group of flow sensations such that: (1) whenever said unsensed process stream passes through a transfer point between either of said pair of process stream and said flow-measuring point, proceeding downstream along said flow path, then $$A = S_L^1 - S_E^1$$

where $S_L^1 =$ sum of the flow rates of all process streams leaving said flow path between the downstream one of said pair of process streams and said flow-measuring point, proceeding upstream along said flowpath, and $S_E^1 =$ sum of the flow rates of all process streams entering said flow path between the downstream one of said pair of process streams and said flow-measuring point, proceeding upstream along said flow path, and (2) whenever said unsensed process stream passes through a transfer point between either of said pair of process streams and said flow-measuring point, proceeding upstream along said flow path, then $$A = S_E^2 - S_L^2$$

where $S_E^2 =$ sum of the flow rates of all process streams entering said flow path between the upstream one of said pair of process streams and said flow-measuring point, proceeding downstream along said flow path, and $S_L^2 =$ sum of the flow rates of all process streams leaving said flow path between the upstream one of said pair of process streams and said flow-measuring point, proceeding downstream along said flow path; and adjusting said flow-varying means in response both to said first flow sensation and to said setpoint signal.

16. In a continuous fluid-solid contacting process for altering the composition of a feed stream to yield a product stream wherein a pumparound fluid is continuously circulated through an elongated contatcing zone containing a solid contacting material which effects said alteration of composition, one end of said contacting zone communicating with the other through a flow-varying means to form a closed flow path therethrough and said contacting zone having a plurality of intermittently flow-conducting transfer points spaced along the length of said flow path, and wherein $r$ fluid process streams including said feed and product streams are substantially simultaneously introduced to and withdrawn from said contacting zone through a set of corresponding inlet and outlet points selected from said transfer points, and wherein a flush stream is charged to said contacting zone through a transfer point which is upstream from the feed inlet point, said flush stream and said process streams hereinafter being collectively designated as "secondary" streams, and wherein said secondary streams are periodically shifted in unison successively from one set of transfer points to the next in a downstream direction with respect to the flow of said pumparound fluid whereby each of said secondary streams eventually passes through each of said transfer points, the method of controlling the flow rate of said pumparound fluid existing within that portion of said contacting zone which lies between a selected pair of adjacent secondary streams, irrespective of their instantaneous physical position relative to said flow-varying means, which method comprises: sensing the flow rate of said pumparound fluid existing at a fixed flow-measuring point in said flow path and producing a first flow sensation corresponding thereto; separately sensing the flow rates of $r$ secondary streams and producing a group of flow sensations corresponding thereto, the flow rate of the remaining secondary stream being unsensed; producing a setpoint signal P whose magnitude is defined by $$P = K + A$$

where K is the desired magnitude of the pumparound flow herein controlled and A is automatically computed from said group of flow sensations such that (1) whenever said unsensed secondary stream passes through a transfer point between either of said pair of secondary streams and said flow-measuring point, proceeding downstream along said flow path, then $$A = S_L^1 - S_E^1$$

where $S_L^1$ = sum of the flow rates of all secondary streams leaving said flow path between the downstream one of said pair of secondary streams and said flow-measuring point, proceeding upstream along said flow path, and $S_E^1$ = sum of the flow rates of all secondary streams entering said flow path between the downstream one of said pair of secondary streams and said flow-measuring point, proceeding upstream along said flow path, and (2) whenever said unsensed secondary stream passes through a transfer point between either of said pair of secondary streams and said flow-measuring point, proceeding upstream along said flow path, then $$A = S_E^2 - S_L^2$$

where $S_E^2$ = sum of the flow rates of all secondary streams entering said flow path between the upstream one of said pair of secondary streams and said flow-measuring point, proceeding downstream along said flow path, and $S_L^2$ = sum of the flow rates of all secondary streams leaving said flow path between the upstream one of said pair of secondary streams and said flow-measuring point, proceeding downstream along said flow path; and adjusting said flow-varying means in response to said first flow sensation and to said setpoint signal.

17. In a continuous process for separating the components of a mixture of fluid compounds, at least one of which is selectively sorbed by contact with a solid sorbent and at least one other component is relatively less sorbed by the sorbent which is capable of having its sorbency restored by displacing selectively sorbed component therefrom, wherein a pumparound fluid is continuously circulated through an elongated contacting zone containing said solid sorbent, one end of said contacting zone communicating with the other through a flow-varying means to form a closed flow path therethrough and said contacting zone having a plurality of intermittently flow-conducting transfer points spaced along the length of said flow path, and wherein there are substantially simultaneously introduced to and withdrawn from said contacting zone in alternating relationship r fluid process streams including, in the following order and proceeding in a downstream direction with respect to the flow of said pumparound fluid, (a) a feed stream containing said mixture of fluid compounds, (b) a first product stream containing relatively less sorbed component, (c) a desorbent stream capable of displacing the selectively sorbed component from said sorbent, and (d) a second product stream containing a mixture of selectively sorbed component and desorbent, said process streams being passed through a set of corresponding inlet and outlet points selected from said transfer points, and wherein said process streams are periodically shifted in unison successively from one set of tranfer points to the next in a downstream direction with respect to the flow of said pumparound fluid whereby each of said process streams eventually passes through each of said transfer points, the method controlling the flow rate of said pumparound fluid existing within that portion of said contacting zone which lies between a selected pair of adjacent process streams, irrespective of their instantaneous physical position relative to said flow-varying means, which method comprises: sensing the flow rate of said pumparound fluid existing at a fixed flow-measuring point in said flow path and producing a first flow sensation corresponding thereto; separately sensing the flow rates of $r-1$ process streams and producing a group of flow sensations corresponding thereto, the flow rate of the remaining process stream being unsensed; producing a setpoint signal P whose magnitude is defined by $$P = K + A$$

where K is the desired magnitude of the pumparound flow herein controlled and A is automatically computed from said group of flow sensations such that (1) whenever said unsensed process stream passes through a transfer point between either of said pair of process streams and said flow-measuring point, proceeding downstream along said flow path, then $$A = S_L^1 - S_E^1$$

where $S_L^1$ = sum of the flow rates of all process streams leaving said flow path between the downstream one of said pair of process streams and said flow-measuring point, proceeding upstream along said flow path, and $S_E^1$ = sum of the flow rates of all process streams entering said flow path between the downstream one of said pair of process streams and said flow-measuring point, proceeding upstream along said flow path, and (2) whenever said unsensed process stream passes through a transfer point between either of said pair of process streams and said flow-measuring point, proceeding upstream along said flow path, then $$A = S_E^2 - S_L^2$$

where $S_E^2$ = sum of the flow rates of all process streams entering said flow path between the upstream one of said pair of process streams and said flow-measuring point, proceeding downstream along said flow path, and $S_L^2$ = sum of the flow rates of all process streams leaving said flow path between the upstream one of said pair of process streams and said flow-measuring point, proceeding downstream along said flw path; and adjusting said flow-regulating means in response both to said first flow sensation and to said setpoint signal.

18. In a continuous process for separating the components of a mixture of fluid compounds, at least one of which is selectively sorbed by contact with a solid sorbent and at least one other component is relatively less sorbed by the sorbent which is capable of having its sorbency restored by displacing selectively sorbed component therefrom, wherein a pumparound fluid is continuously circulated through an elongated contacting zone containing said solid sorbent, one end of said contacting zone communicating with the other through a flow-varying means to form a closed flow path therethrough and said contacting zone having a plurality of intermittently flow-conducting transfer points spaced along the length of said flow path, and wherein there are substantially simultaneously introduced to and withdrawn from said contacting zone in alternating relationship r fluid process streams including, in the following order and proceeding in a downstream direction with respect to the flow of said pumparound fluid, (a) a feed stream containing said mixture of fluid compounds, (b) a first product stream containing relatively less sorbed component, (c) a desorbent stream capable of displacing the selectively sorbed component from said sorbent, and (d) a second product stream containing a mixture of selectively sorbed component and desorbent, said process streams being passed through a set of corresponding inlet and outlet points selected from said transfer points, and wherein a flush stream is charged to said contacting zone through a transfer point which is upstream from the feed inlet point, said flush stream and said process streams hereinafter being collectively designated as "secondary" streams, and wherein said secondary streams are periodically shifted in unison successively from one set of transfer points to the next in a downstream direction with respect to the flow of said pumparound fluid whereby each of said secondary streams eventually passes through each of said transfer points, the method of controlling the flow rate of said pumparound fluid existing within that portion of said contacting zone which lies between a selected pair of adjacent secondary streams, irrespective of their instantaneous physical position relative to said flow-varying means, which method comprises: sensing the flow rate of said pumparound fluid existing at a fixed flow-measuring point in said flow path and producing a first flow sensation corresponding thereto; separately sensing the flow rates of $r$ secondary streams and producing a group of flow sensations corresponding thereto, the flow rate of the remaining secondary stream being unsensed; producing a setpoint signal P whose magnitude is defined by $$P = K + A$$

where K is the desired magnitude of the pumparound flow herein controlled and A is automatically computed from said group of flow sensations such that (1) whenever said unsensed secondary stream passes through a transfer point between either of said pair of secondary streams and said flow-measuring point, proceeding downstream along said flow path, then $$A = S_L^1 - S_E^1$$

where $S_L^1$=sum of the flow rates of all secondary streams leaving said flow path between the downstream one of said pair of secondary streams and said flow-measuring point, proceeding upstream along said flow path, and $S_E^1$=sum of the flow rates of all secondary streams entering said flow path between the downstream one of said pair of secondary streams and said flow-measuring point, proceeding upstream along said flow path, and (2) whenever said unsensed secondary stream passes through a transfer point between either of said pair of secondary streams and said flow-measuring point, proceeding upstream along said flow path, then $$A = S_E^2 - S_L^2$$

where $S_E^2$=sum of the flow rates of all secondary streams entering said flow path between the upstream one of said pair of secondary streams and said flow-measuring point, proceeding downstream along said flow path, and $S_L^2$=sum of the flow rates of all secondary streams leaving said flow path between the upstream one of said pair of secondary streams and said flow-measuring point, proceeding downstream along said flow path; and adjusting said flow-varying means in response both to said first flow sensation and to said setpoint signal.

19. In combination with a fluid treating apparatus including (1) a treating vessel having a plurality of fluid transfer ports spaced along its length, (2) a pumparound means for circulating fluid from one end of said vessel to the other, (3) $r$ fluid transport conduits for introducing fluid to and withdrawing fluid from said treating vessel, and (4) stream distributing means connecting each of said transport conduits to a corresponding one of said transfer ports and periodically simultaneously reconnecting said transport conduits to successive sets of transfer ports so that each transport conduit eventually comes into fluid communication for a time with each of said transfer ports, those transfer ports which are presently conducting fluid hereinafter being designated as "active" transfer ports, a fluid flow control system therefor which comprises: at least $r-1$ flow sensing means each separately associated with $r-1$ of said $r$ fluid transport conduits and each transmitting a flow signal responsive to the rate of fluid flow therethrough; flow-regulating means operatively connected with said pumparound means; computer means synchronized with said stream distributing means and receiving the flow signals from said $r-1$ flow sensing means; said counter means producing a setpoint signal in accordance with the flow signals from said $r-1$ flow sensing means and with the distribution of said active transfer ports relative to said flow-regulating means; and said computer means operatively connected with said flow-regulating means and transmitting said setpoint signal to said flow-regulating means.

20. In combination with a fluid treating apparatus including (1) a treating vessel having a plurality of fluid transfer ports spaced along its length, (2) a pumparound means for circulating fluid from one end of said vessel to the other, (3) $r$ fluid transport conduits for introducing fluid to and withdrawing fluid from said treating vessel, (4) a flush circulating means for passing flush fluid from one intermediate point in said treating vessel to another, and (5) stream distributing means connecting each of said transport conduits to a corresponding one of said transfer ports and connecting said flush circulating means to a corresponding pair of said transfer ports and periodically simultaneously reconnecting said transport conduits and said flush circulating means to successive sets of transfer ports so that each transport conduit and said flush circulating means eventually come into fluid communication for a time with each of said transfer ports, those transfer ports which are presently conducting fluid hereinafter being designated as "active" transfer ports, a fluid flow control system therefor which comprises: at least $r$ flow sensing means each separately associated with $r-1$ of said transport conduits and with said flush circulating means and each transmitting a flow signal responsive to the rate of fluid flow therethrough; flow-regulating means operatively connected with said pumparound means; computer means synchronized with said stream distributing means and receiving the flow signals from said $r$ flow sensing means; said computer means producing a setpoint signal in accordance with the flow signals from said $r$ flow sensing means and with the distribution of said active transfer ports relative to said flow-regulating means; and said computer means operatively connected with said flow-regulating means and transmitting said setpoint signal to said flow-regulating means.

References Cited by the Examiner
UNITED STATES PATENTS

| | | | |
|---|---|---|---|
| 2,976,234 | 3/1961 | Webber | 196—132 X |
| 2,985,589 | 5/1961 | Broughton et al. | 260—676 |
| 3,018,230 | 1/1962 | Morgan | 196—132 X |

DELBERT E. GANTZ, *Primary Examiner.*

ALPHONSO D. SULLIVAN, DANIEL E. WYMAN, *Examiners.*

C. E. SPRESSER, P. P. GARVIN, *Assistant Examiners.*